US009465979B2

(12) United States Patent
Tsukizawa et al.

(10) Patent No.: US 9,465,979 B2
(45) Date of Patent: Oct. 11, 2016

(54) MEASUREMENT-TARGET-SELECTING DEVICE, FACE-SHAPE-ESTIMATING DEVICE, METHOD FOR SELECTING MEASUREMENT TARGET, AND METHOD FOR ESTIMATING FACE SHAPE

(71) Applicant: Panasonic Intellectual Property Corporation of America, Torrance, CA (US)

(72) Inventors: Sotaro Tsukizawa, Osaka (JP); Hiroyuki Kubotani, Hyogo (JP); ZhiHeng Niu, Singapore (SG); Sugiri Pranata, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 99 days.

(21) Appl. No.: 14/363,942

(22) PCT Filed: Dec. 4, 2012

(86) PCT No.: PCT/JP2012/007769
§ 371 (c)(1),
(2) Date: Jun. 9, 2014

(87) PCT Pub. No.: WO2013/088672
PCT Pub. Date: Jun. 20, 2013

(65) Prior Publication Data
US 2014/0369571 A1 Dec. 18, 2014

(30) Foreign Application Priority Data

Dec. 13, 2011 (JP) .................................. 2011-272203

(51) Int. Cl.
G06K 9/00 (2006.01)
(52) U.S. Cl.
CPC ....... *G06K 9/00315* (2013.01); *G06K 9/00248* (2013.01); *G06K 9/00281* (2013.01); *G06K 9/00335* (2013.01)

(58) Field of Classification Search
None
See application file for complete search history.

(56) References Cited

U.S. PATENT DOCUMENTS

| | | | |
|---|---|---|---|
| 6,556,196 B1* | 4/2003 | Blanz | G06K 9/00275 345/419 |
| 2009/0129665 A1* | 5/2009 | Ishiyama | G01B 11/24 382/154 |
| 2011/0069879 A1 | 3/2011 | Hwang et al. | |

FOREIGN PATENT DOCUMENTS

| | | |
|---|---|---|
| JP | 2005-182247 A | 7/2005 |
| JP | 2010-128742 A | 6/2010 |
| JP | 2011-128966 A | 6/2011 |

OTHER PUBLICATIONS

Paul Viola and Michael J. Jones, "Rapid Object Detection using a Boosted Cascade of Simple Features", IEEE CVPR, 2001.
International Search Report for Application No. PCT/JP2012/007769 dated Mar. 5, 2013.
Extended European Search Report for Application No. 12856849.0-1901/2793184 dated May 15, 2015.

\* cited by examiner

*Primary Examiner* — Daniel Mariam
(74) *Attorney, Agent, or Firm* — Pearne & Gordon LLP

(57) ABSTRACT

A measurement-target-selecting device that is capable of estimating a face shape with high precision and at low computational time. In this device, a face texture assessment value calculating part (103) calculates a face texture assessment value representing a degree of match between an input face image and the texture of a face shape candidate, a facial-expression-change-likelihood-calculating part (104) calculates a first likelihood between a face shape constituting a reference and a face shape candidate, a correlation assessment part (105); calculates a first correlation assessment value representing the strength of a correlation between the face texture assessment value and the first likelihood, and a selection part (107) selects from among the plurality of face shape candidates as a measurement target a face shape candidate having a first correlation assessment value that is lower than a first threshold.

15 Claims, 16 Drawing Sheets

MEASUREMENT-TARGET-SELECTING DEVICE, FACE-SHAPE-ESTIMATING DEVICE, METHOD FOR SELECTING MEASUREMENT TARGET, AND METHOD FOR ESTIMATING FACE SHAPE

TECHNICAL FIELD

The present invention relates to a measurement target extracting apparatus, a face shape estimating apparatus, a measurement target extracting method, and a face shape estimating method.

BACKGROUND ART

The shape of a face having a change in expression may be estimated in order to find out an emotion or a state of a person. When a driver feels drowsy while driving a car, a change in expression such as frown, puckered lips or puffed cheeks during deep breathing may appear on his face, for example. Accordingly, these changes in expression can be used as an index for checking the drowsiness of the driver.

In a method according to related art, for estimating face shape that has been used, in order to improve the accuracy in estimating the face shape, a face shape is estimated under a constraint that each facial part, that is, eyes, nose, mouth, or others is in its standard shape and position when the person is expressionless. However, with the face shape estimating method, a face in which the change in expression described above is observed but is away from a standard shape cannot be detected due to the constraint. Note that, the expression "change in expression" used herein refers to a state where the face is not expressionless.

In contrast, according to the technique disclosed in NPL1 (hereafter related art 1), the shape and the position of the facial parts when the expression changes can be detected by previously learning an image of a face in which a change in expression has occurred. In addition, according to the technique disclosed in PTL1 (hereafter related art 2), measurement of a three dimensional position of a facial part is performed, and a stereoscopic shape of the face is estimated from the three dimensional position of the facial part. With these operations, the techniques disclosed in NPL1 and PTL1 are capable of detecting a face in which the change in expression described above is observed.

CITATION LIST

Patent Literature

PTL1
Japanese Patent Application Laid-Open No. 2005-182247

Non-Patent Literature

NPL1
Paul Viola and Michael J. Jones, "Rapid Object Detection using a Boosted Cascade of Simple Features", IEEE CVPR, 2001

SUMMARY OF INVENTION

Technical Problem

However, related art 1 uses two-dimensional information as an image for learning, so that related art 1 is unable to respond to a case where the shape of the face part does not change two-dimensionally (in planar view), but three-dimensionally (in stereoscopic view). For example, related art 1 is unable to respond to the changes in expression such as puckering lips and puffing cheeks.

Related art 2 requires measurement of the three-dimensional positions of the entire face in order to detect the change in expression (to estimate stereoscopic shape of a face), which involves a large amount of calculation for estimating the face shape. Accordingly, with related art 2, it is difficult to detect a face with a change in expression in real time.

It is an object of the present invention to provide a measurement target extracting apparatus, a face shape estimating apparatus, a measurement target extracting method, and a face shape estimating method capable of estimating a shape of a face having a stereoscopic change in expression difficult to detect using a two-dimensional image only.

Solution to Problem

A measurement target extracting apparatus according to an aspect of the present invention is an apparatus that extracts a candidate for a three-dimensional shape measurement target among a plurality of face shape candidates, the apparatus including: a facial texture evaluation value calculating section that calculates, for each of the plurality of face shape candidates, a facial texture evaluation value representing a degree of match between an input face image and a texture of the face shape candidate; a likelihood calculating section that calculates, for each of the plurality of face shape candidates, first likelihood between a reference face shape and the face shape candidate; a correlation evaluation section that calculates, for each of the plurality of face shape candidates, a first correlation evaluation value representing a degree of correlation between the facial texture evaluation value and the first likelihood; and an extracting section that extracts, from the plurality of face shape candidates, a face shape candidate having the first correlation evaluation value lower than a first threshold, as the measurement target.

A face shape estimating apparatus according to an aspect of the present invention includes: the measurement target extracting apparatus; a three-dimensional shape measuring section that measures a three-dimensional shape of a face shape candidate extracted as the measurement target by the measurement target extracting apparatus; a shape candidate evaluation section that calculates a first shape candidate evaluation value for each of the plurality of face shape candidates, based on the facial texture evaluation value and the first likelihood; a re-evaluation section that calculates, for each of the plurality of extracted face shape candidates, a second shape candidate evaluation value, using the three-dimensional shape; and a determining section that determines an estimated shape of the facial image from the plurality of face shape candidates based on the first shape candidate evaluation value and the second shape candidate evaluation value.

A measurement target extracting method according to an aspect of the present invention is a method for extracting a candidate for a three-dimensional shape measurement target from a plurality of face shape candidates, the method including: calculating, for each of the plurality of face shape candidates, a facial texture evaluation value representing a degree of match between an input face image and a texture of the face shape candidate; calculating, for each of the plurality of face shape candidates, first likelihood between a reference face shape and the face shape candidate; calculating, for each of the plurality of face shape candidates, a first correlation evaluation value representing a degree of correlation between the facial texture evaluation value and the first likelihood; and extracting, from the plurality of face shape candidates, a face shape candidate having the first correlation evaluation value lower than a first threshold, as the measurement target.

A face shape estimating method according to an aspect of the present invention is a method including: measuring a three-dimensional shape of a face shape candidate extracted as the measurement target by the measurement target extracting method; calculating a first shape candidate evaluation value for each of the plurality of face shape candidates, based on the facial texture evaluation value and the first likelihood; calculating, for each of the plurality of extracted face shape candidates, a second shape candidate evaluation value, using the three-dimensional shape; and determining an estimated shape of the facial image from the plurality of face shape candidates based on the first shape candidate evaluation value and the second shape candidate evaluation value.

Advantageous Effects of Invention

According to the present invention, the shape of a face having a stereoscopic change in expression difficult to detect using a two-dimensional image can be estimated highly accurately with a small amount of calculation.

DESCRIPTION OF EMBODIMENTS

Embodiments of the present invention will be described in detail with reference to the drawings as follows.

Embodiment 1

Figure 1:
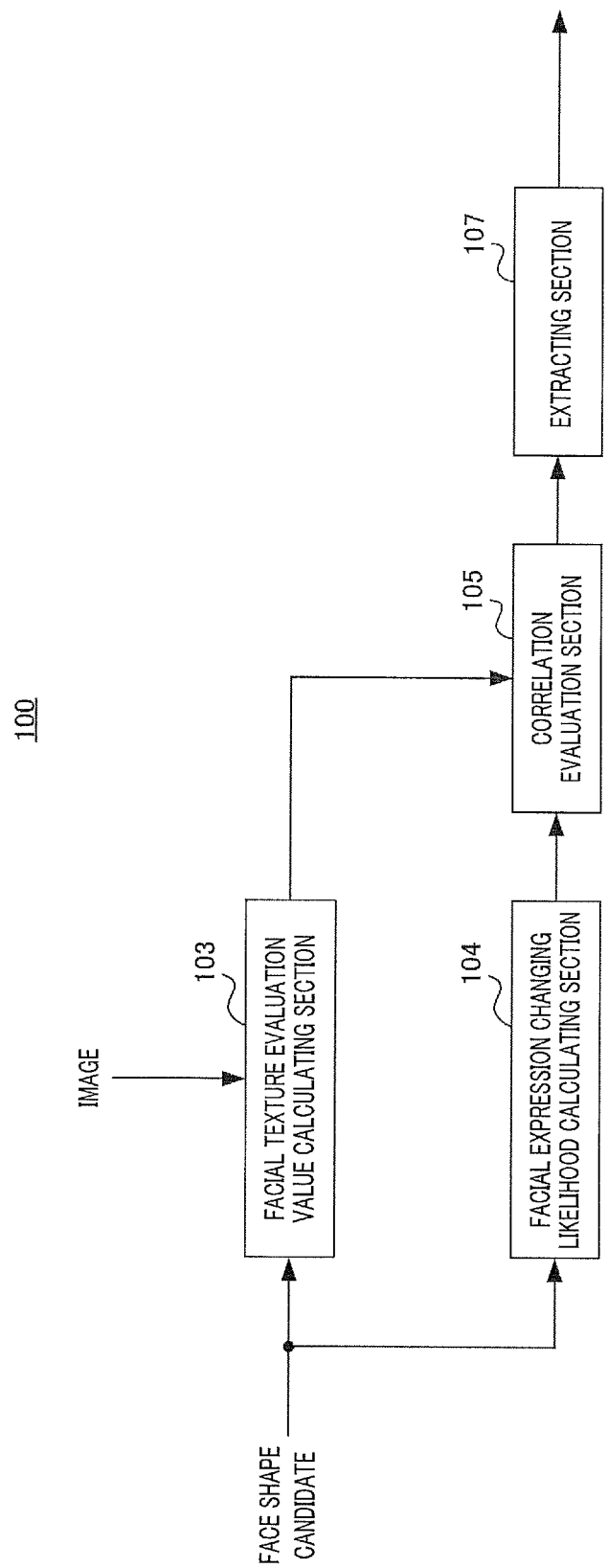
FIG. 1 is a block diagram illustrating major components of a measurement target extracting apparatus according to Embodiment 1 of the present invention.

FIG. 1 is a block diagram illustrating major components of measurement target extracting apparatus 100 according to Embodiment 1. Measurement target extracting apparatus 100 illustrated in FIG. 1 includes, as major components, facial texture evaluation value calculating section 103, facial expression changing likelihood calculating section 104, correlation evaluation section 105, and extracting section 107. Measurement target extracting apparatus 100 extracts a candidate for measurement of three-dimensional shape from a plurality of face shape candidates.

In measurement target extracting apparatus 100, facial texture evaluation value calculating section 103 calculates a facial texture evaluation value representing the degree of match between the texture of an input face image and texture of a face shape candidate for each of the face shape candidates. Facial expression changing likelihood calculating section 104 calculates, for each of the plurality of face shape candidates, first likelihood between a reference face shape and the face shape candidate (facial expression changing likelihood). Correlation evaluation section 105 calculates, for each of the plurality of face shape candidates, the first correlation evaluation value representing the degree of correlation between the facial texture evaluation value and the first likelihood. Extracting section 107 extracts, from the plurality of face shape candidates, a face shape candidate having a first correlation evaluation value lower than a first threshold as a target to be measured.

[Configuration of Measurement Target Extracting Apparatus 100]

Figure 2:
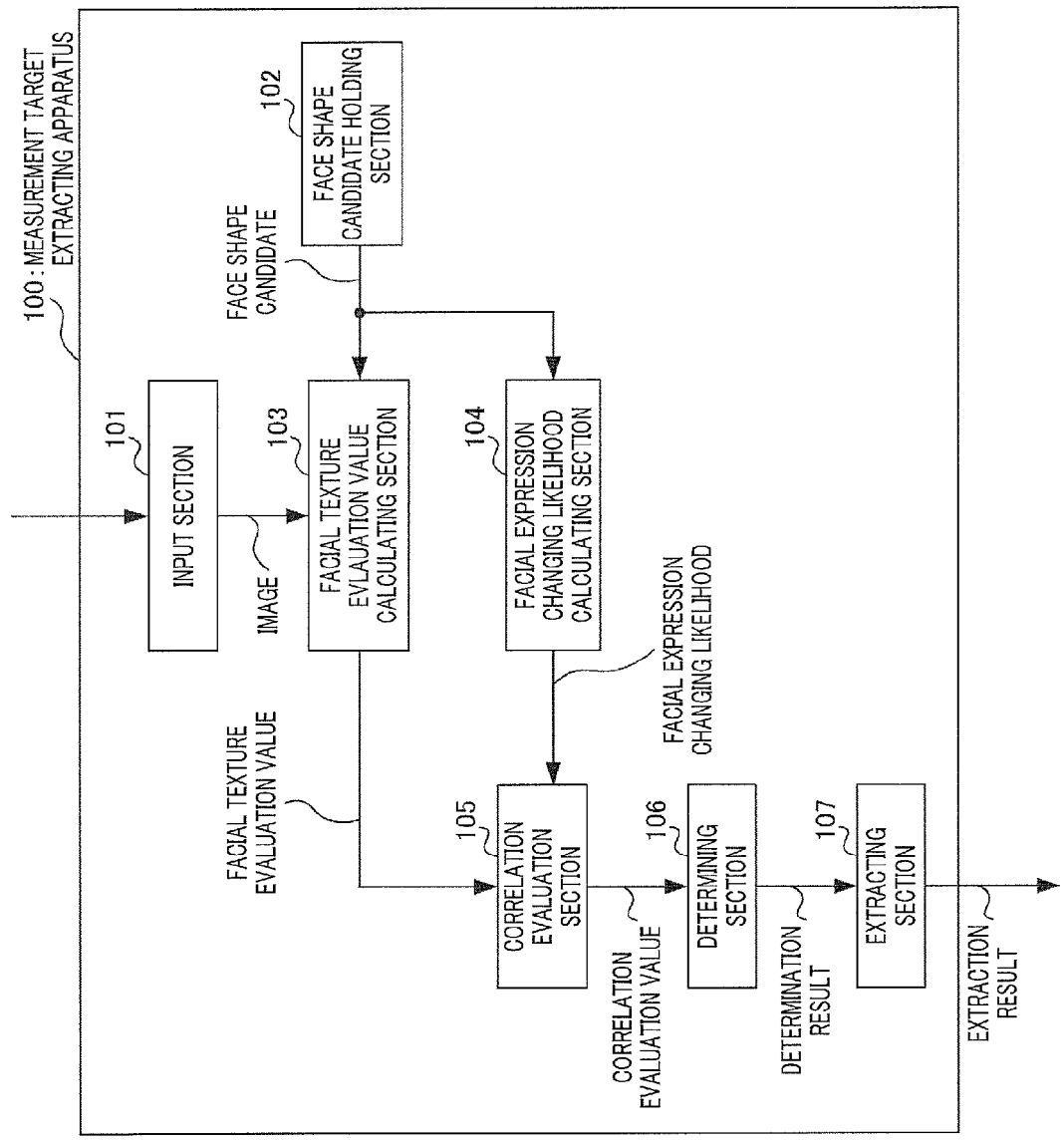
FIG. 2 is a block diagram illustrating a configuration of a measurement target extracting apparatus according to Embodiment 1 of the present invention.

FIG. 2 is a block diagram illustrating major components of measurement target extracting apparatus 100 according to Embodiment 1. In FIG. 2, measurement target extracting apparatus 100 includes input section 101, face shape candidate holding section 102, facial texture evaluation value calculating section 103, facial expression changing likelihood calculating section 104, correlation evaluation section 105, determining section 106, and extracting section 107.

Input section 101 obtains a two-dimensional image input from outside, and outputs the obtained image to facial texture evaluation value calculating section 103. The image obtained by input section 101 may be an image captured by a camera provided at a location where a face can be captured, for example, on a steering wheel or on a dashboard, an image obtained by clipping data for one frame each from video data captured in advance, or an image stored in storage or the like. Moreover, the image input to input section 101 may be an image in portable pix map (PPM) format captured by a camera including a complementary metal oxide semiconductor (CMOS) image sensor and a lens, for example.

Face shape candidate holding section 102 holds at least one face shape candidate and outputs the face shape candidate to facial texture evaluation value calculating section 103 and facial expression changing likelihood calculating section 104. The term "face shape candidate" refers to data including coordinates of a plurality of feature points on a face (three-dimensional coordinates) and texture which is luminance information of each feature point (image of each feature point). For example, a face shape candidate is represented by three-dimensional coordinates of a feature point representing a facial part such as the outer corner of an eye, an inner corner of an eye, a corner of a mouth, an inner end of the eyebrow, or the like, and texture representing luminance distribution around the feature point.

Facial texture evaluation value calculating section 103 compares an image input from input section 101 (the input image) and a face shape candidate input from face shape candidate holding section 102, to calculate a facial texture evaluation value with respect to the input image. Facial texture evaluation value calculating section 103 outputs a facial texture evaluation value for each of the face shape candidates to correlation evaluation section 105.

The "facial texture evaluation value" denotes a value representing a degree of match (degree of match in two dimensions) between texture of the face shape candidate (texture of a feature point included in the face shape candidate) and the input image. The higher the degree of match between the texture of the feature point and the input image is, the higher the facial texture evaluation value becomes. For example, facial texture evaluation value calculating section 103 calculates, for a face shape candidate, a degree of match (evaluation value) between a plurality of feature points in the face shape candidate and an input image, and the sum of the degrees of match (evaluation values) in each feature point may be a facial texture evaluation value of the face shape candidate.

More specifically, facial texture evaluation value calculating section 103 first calculates two-dimensional coordinates of each feature point on an input image plane by projecting each feature point of the face shape candidate on the input image. Subsequently, facial texture evaluation value calculating section 103 calculates a degree of match between the input image around the two-dimensional coordinates calculated (texture) and texture of each feature point in the face shape candidate. The degree of match is calculated by a sum of absolute difference (SAD) or a normalized cross-correlation.

Facial expression changing likelihood calculating section 104 calculates facial expression changing likelihood using a face shape candidate input from face shape candidate holding section 102 and outputs facial expression changing likelihood for each of the face shape candidates to correlation evaluation section 105. The term "facial expression changing likelihood" refers to a value representing a degree of naturalness of the face after the change in expression. More specifically, the term "facial expression changing likelihood" refers to a value representing how natural, as a human face, the shape of the face shown in the face shape candidate is.

Facial expression changing likelihood is likelihood between a face shape used as a reference and the face shape candidate. For example, when the face shape used as the reference is an expressionless face shape, the facial expression changing likelihood will be lower, the larger the amount of change from the expressionless state. For example, facial expression changing likelihood calculating section 104 may use a value of function inversely proportional to the sum of the amount of change between three-dimensional coordinates of a feature point in a face shape candidate and three-dimensional coordinates at a position corresponding to the feature point in the expressionless face shape (the face shape used as the reference) (that is, the distance) as facial expression changing likelihood of the face shape candidate.

Correlation evaluation section 105 calculates, for each of face shape candidates, a correlation evaluation value representing a degree of correlation between a facial texture evaluation value input from facial texture evaluation value calculating section 103 and facial expression changing likelihood input from facial expression changing likelihood calculating section 104, and outputs the correlation evaluation value to determining section 106. The "correlation evaluation value" can be represented by a reciprocal of a distance from a proportional straight line of the facial texture evaluation value and the facial expression changing likelihood in a sample set represented by the facial texture evaluation values and the facial expression changing likelihood, for example. In this case, the stronger the correlation between the facial texture evaluation value and the facial expression changing likelihood (the shorter the distance from the proportional straight line) is, the larger the correlation evaluation value becomes.

Determining section 106 determines whether or not the correlation evaluation value of each face shape candidate input from correlation evaluation section 105 is smaller than a predetermined threshold, and outputs the determination result to extracting section 107.

Extracting section 107 extracts, from the face shape candidates held by face shape candidate holding section 102, a face shape candidate having a correlation evaluation value lower than the predetermined threshold in the determination result input from determining section 106, as a target for measuring a three-dimensional shape. More specifically, extracting section 107 extracts a face shape candidate having weak correlation between a facial texture evaluation value and facial expression changing likelihood. With this operation, among the plurality of the face shape candidates held by face shape candidate holding section 102, only the face shape candidates extracted by extracting section 107 are determined as a target for measuring three-dimensional shape (three-dimensional ranging).

Figure 3:
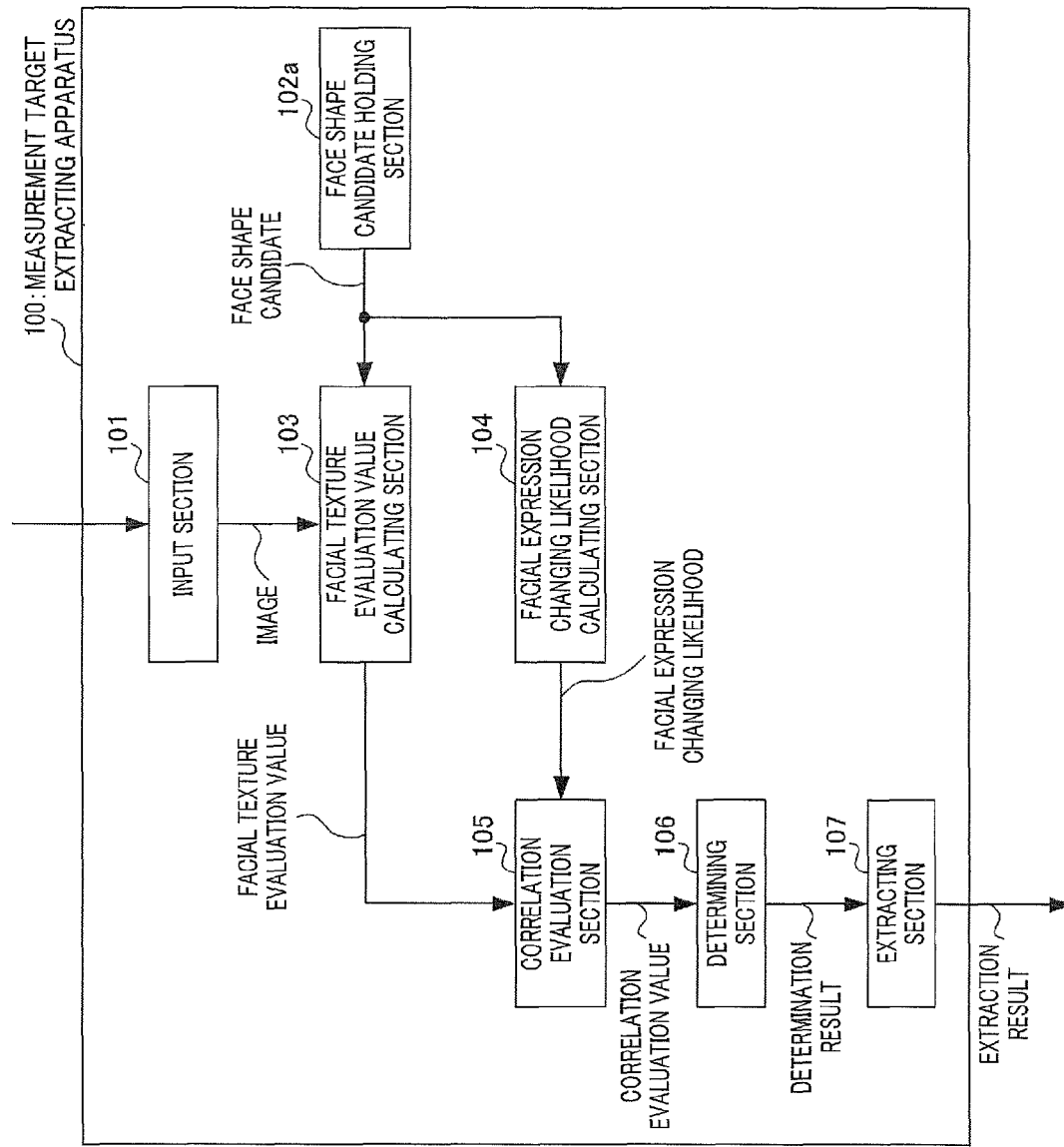
FIG. 3 is a block diagram illustrating a configuration of another measurement target extracting apparatus according to Embodiment 1 of the present invention.

Note that, in Embodiment 1, in measurement target extracting apparatus 100, a case in which an expressionless face shape is used as the reference to calculate the facial expression changing likelihood is described. However, for example, when a face shape estimated a specific time ago is trustworthy, measurement target extracting apparatus 100 may use a face shape previously estimated as the reference for calculating the facial expression changing likelihood. For example, in measurement target extracting apparatus 100 illustrated in FIG. 3, face shape candidate holding section 102a may hold information (shape information) regarding the shape of the face obtained a specific time ago. The shape information includes coordinates of a plurality of feature points on the face (three-dimensional coordinates) and texture which is luminance information of each feature point (image of each feature point), in the same manner as the face shape candidate in FIG. 2. Furthermore, the shape information related to the face obtained a specific time ago may be an actually measured value, a value estimated by another system, or an estimation result by face shape estimating apparatus 200 (FIG. 5) to be described later.

Figure 4:
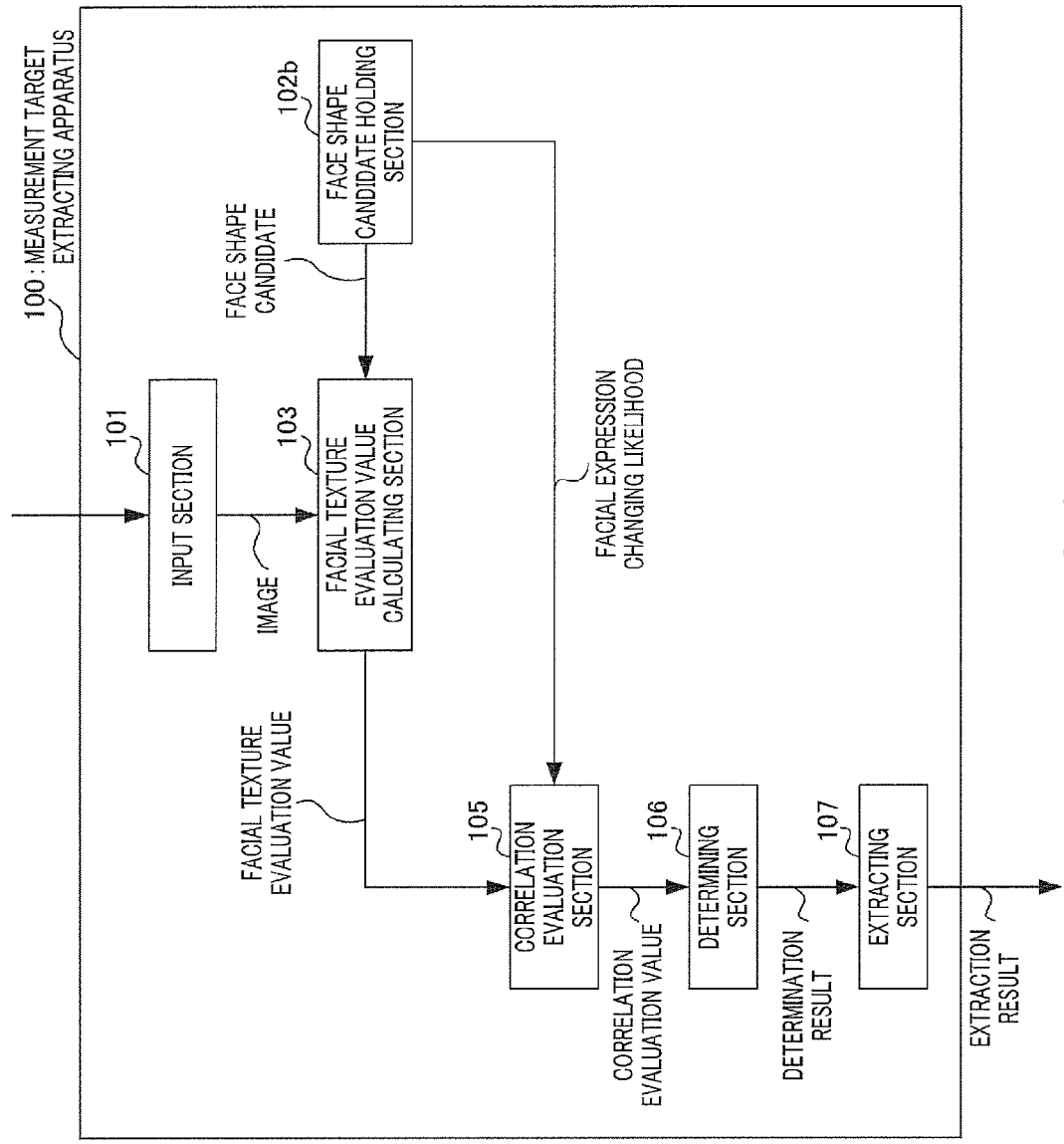
FIG. 4 is a block diagram illustrating a configuration of yet another measurement target extracting apparatus according to Embodiment 1 of the present invention.

In addition, in measurement target extracting apparatus 100, when an expressionless face shape is used as a standard for calculating facial expression changing likelihood, the facial expression changing likelihood may be calculated in advance. Accordingly, for example, in measurement target extracting apparatus 100 illustrated in FIG. 4, face shape candidate holding section 102b may hold facial expression changing likelihood of each face shape candidate calculated in advance, and directly output facial expression changing likelihood to correlation evaluation section 105. Stated differently, facial expression changing likelihood calculating section 104 is not necessary in this case.

[Configuration of Face Shape Estimating Apparatus 200]

Figure 5:
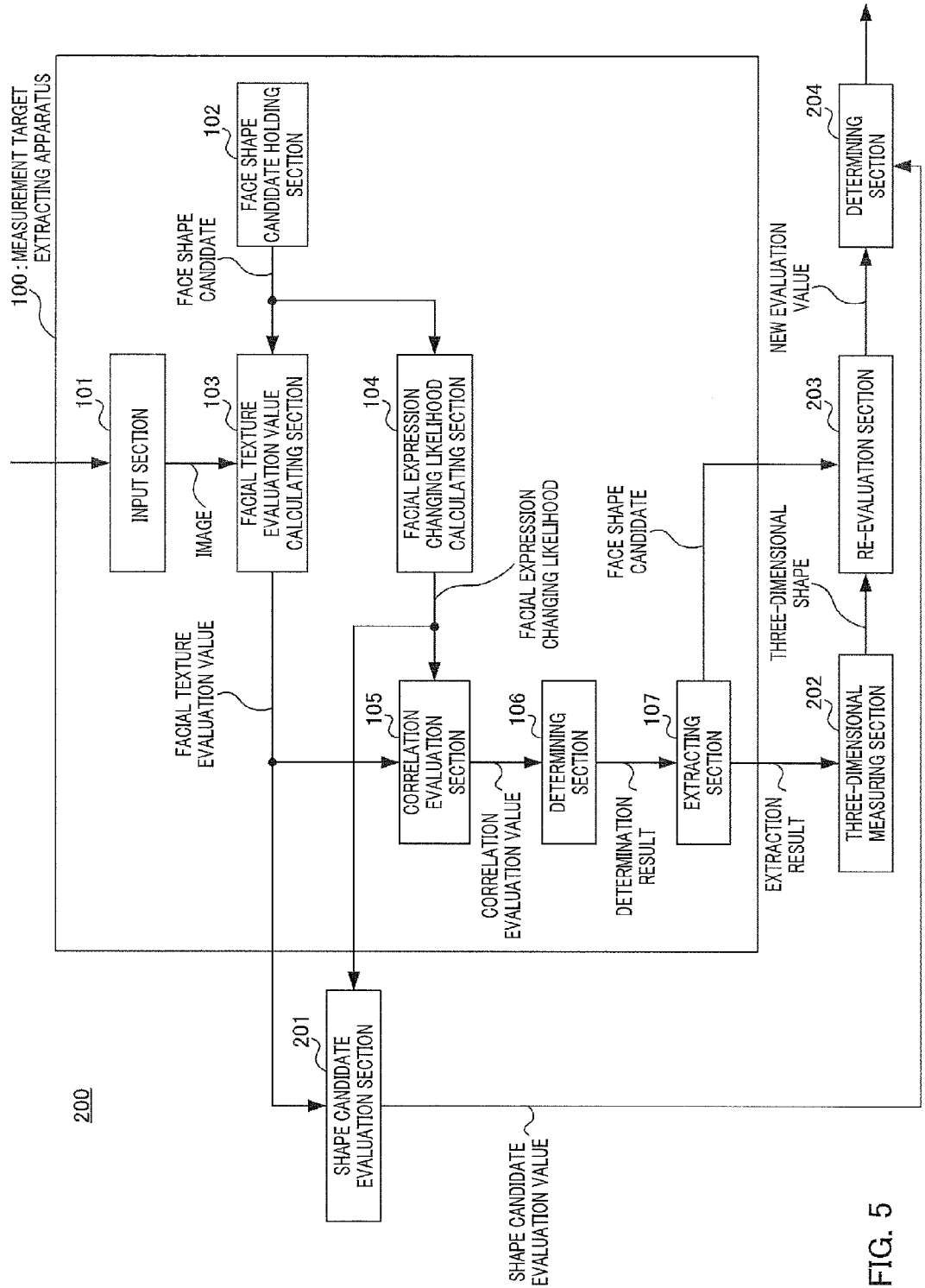
FIG. 5 is a block diagram illustrating a configuration of a face shape estimating apparatus according to Embodiment 1 of the present invention.

FIG. 5 is a block diagram illustrating a configuration of face shape estimating apparatus 200 according to Embodiment 1. In FIG. 5, face shape estimating apparatus 200 includes measurement target extracting apparatus 100 (FIG. 2), shape candidate evaluation section 201, three-dimensional measuring section 202, re-evaluation section 203, and determining section 204.

In the following description, a case in which face shape estimating apparatus 200 estimates a face shape based on a plurality of face shape candidates is described as an example.

Shape candidate evaluation section 201 receives input of a facial texture evaluation value from facial texture evaluation value calculating section 103 in measurement target extracting apparatus 100, and receives input of facial expression changing likelihood from facial expression changing likelihood calculating section 104 in measurement target extracting apparatus 100. Shape candidate evaluation section 201 calculates a shape candidate evaluation value for each of the face shape candidates, using a facial texture evaluation value and facial expression changing likelihood, and outputs the shape candidate evaluation value to determining section 204. The "shape candidate evaluation value" is a value representing a degree of match (evaluation value) between the face shape when an input image is captured and the face shape candidate, and is represented as a multiplication of the facial texture evaluation value and the facial expression changing likelihood, for example.

Three-dimensional measuring section 202 measures (performs distance measurement) a three-dimensional shape of an image position of the face shape candidate extracted as a target for measuring three-dimensional shape (target for three-dimensional distance measurement) projected on an input image by extracting section 107 in measurement target extracting apparatus 100, and outputs the three-dimensional shape of each face shape candidate measured to re-evaluation section 203. For example, three-dimensional measuring section 202 projects a face shape candidate to an input image plane, and performs distance measurement of the projected image region. The distance measurement is performed by using a distance sensor such as a laser range sensor or a stereo camera, for example.

Re-evaluation section 203 calculates a new evaluation value for each of face shape candidates which is a target for measuring the three-dimensional shape, based on the three-dimensional shape input from three-dimensional measuring section 202 and the face shape candidate input from extracting section 107, and outputs the new evaluation value to determining section 204. The "new evaluation value" is a value representing a degree of match between the face shape candidate and the three-dimensional shape. The higher the degree of match between the face shape candidate and the three-dimensional shape is, the higher the new evaluation value is. For example, re-evaluation section 203 compares each feature point (three-dimensional coordinates) of the face shape candidate input from extracting section 107 and three-dimensional shape (three-dimensional coordinates), calculates a degree of match (evaluation value) between each of the plurality of feature points in the face shape candidate and the three-dimensional shape, and determines a product of the sum of the degree of match of each feature point (evaluation value) and a facial texture evaluation value of the face shape candidate as a new evaluation value of the face shape candidate. Stated differently, the new evaluation value (the evaluation value calculated from the three-dimensional shape) corresponds to the shape candidate evaluation value (the evaluation value calculated from a two-dimensional image).

Determining section 204 determines, from face shape candidates held by face shape candidate holding section 102, a candidate having an estimated shape for an input image (facial image), based on a face shape candidate, a shape candidate evaluation value input from shape candidate evaluation section 201, and a new evaluation value input from re-evaluation section 203. For example, determining section 204 determines a face shape candidate corresponding to the largest value among evaluation values including a new evaluation value and a shape candidate evaluation value as an estimated shape of the face for the input image.

Note that, determining section 204 may determine an estimated shape for the input image by calculating a weighted average of a plurality of face shape candidates (three-dimensional coordinates), based on the weight calculated using the new evaluation value and the shape candidate evaluation value. However, for a face shape candidate in which the new calculation value is calculated, determining section 204 uses the new evaluation value as the weight, instead of the face candidate evaluation value. In addition, determining section 204 may use a value obtained by calculating a square of each evaluation value, or a monotonically increasing function such as a sigmoid function using the new evaluation value or the shape candidate evaluation value as a variable, without directly using the new evaluation value or the shape candidate evaluation value as a weight.

[Operation of Face Shape Estimating Apparatus 200]

Figure 6:
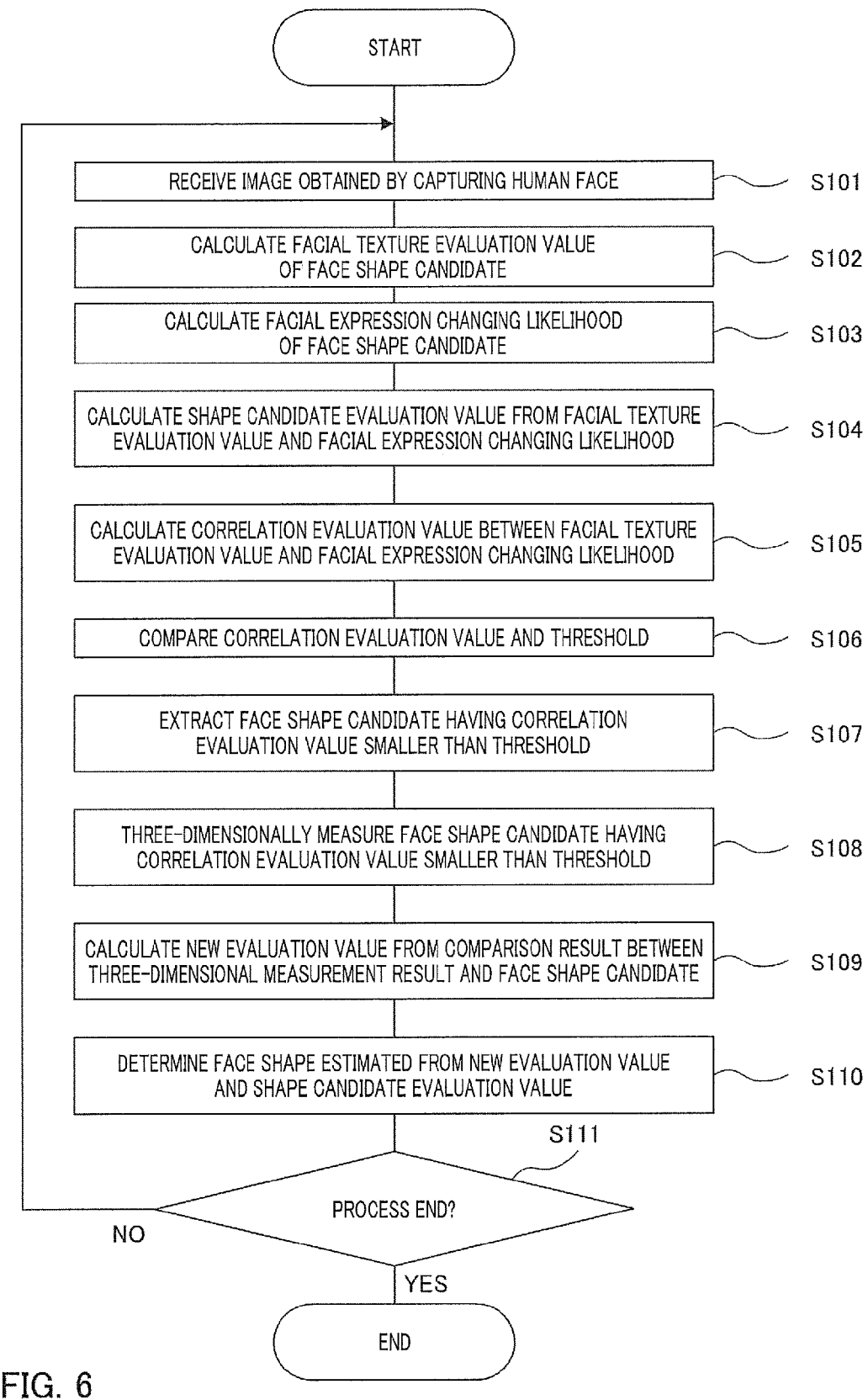
FIG. 6 is a flowchart illustrating operations of a face shape estimating apparatus according to Embodiment 1 of the present invention.

The operation of face shape estimating apparatus 200 having the configuration described above will be described. FIG. 6 is a flowchart illustrating a process for estimating the face shape by face shape estimating apparatus 200. For example, when an image is captured by a camera, the process flow illustrated in FIG. 6 starts when the capturing operation starts. The capturing operation may be started by an operation by the user, or using an external signal as a trigger.

In step (hereafter referred to as S) 101 illustrated in FIG. 6, input section 101 obtains an image obtained by capturing a face of a person (input image), and outputs the input image to facial texture evaluation value calculating section 103.

In S102, facial texture evaluation value calculating section 103 calculates a facial texture evaluation value of each face shape candidate from a face shape candidate input from face shape candidate holding section 102 and an input image input from input section 101 in S101.

In S103, facial expression changing likelihood calculating section 104 calculates facial expression changing likelihood of the face shape candidate input from face shape candidate holding section 102.

In S104, shape candidate evaluation section 201 calculates a shape candidate evaluation value of a face shape candidate from the facial texture evaluation value calculated in S102 and the facial expression changing likelihood calculated in S103. For example, the shape candidate evaluation value is calculated as a product or a sum of the facial texture evaluation value and the facial expression changing likelihood.

In S105, correlation evaluation section 105 calculates correlation evaluation value e between the facial texture evaluation value calculated in S102 and facial expression changing likelihood calculated in S103. For example, correlation evaluation value e is calculated by the following method. First, correlation evaluation section 105 calculates first main components using a plurality of facial texture evaluation values and facial expression changing likelihood of a plurality of face shape candidates as a sample set and using the facial texture evaluation value and facial expression changing likelihood as variables, and obtains a straight line representing the first main components. Note that, correlation evaluation section 105 may use a proportional straight line of facial texture evaluation value and facial expression changing likelihood obtained in advance, instead of the straight line representing the first main components. Subsequently, correlation evaluation section 105 calculates distance d between the straight line representing the first main components and the face shape candidate which is an evaluation target (a sample point represented by a facial texture evaluation value and facial expression changing likelihood). Correlation evaluation section 105 calculates correlation evaluation value e according to the following Equation 1.

[1]

$$e = \frac{1}{1+d} \quad \text{(Equation 1)}$$

Figure 7:
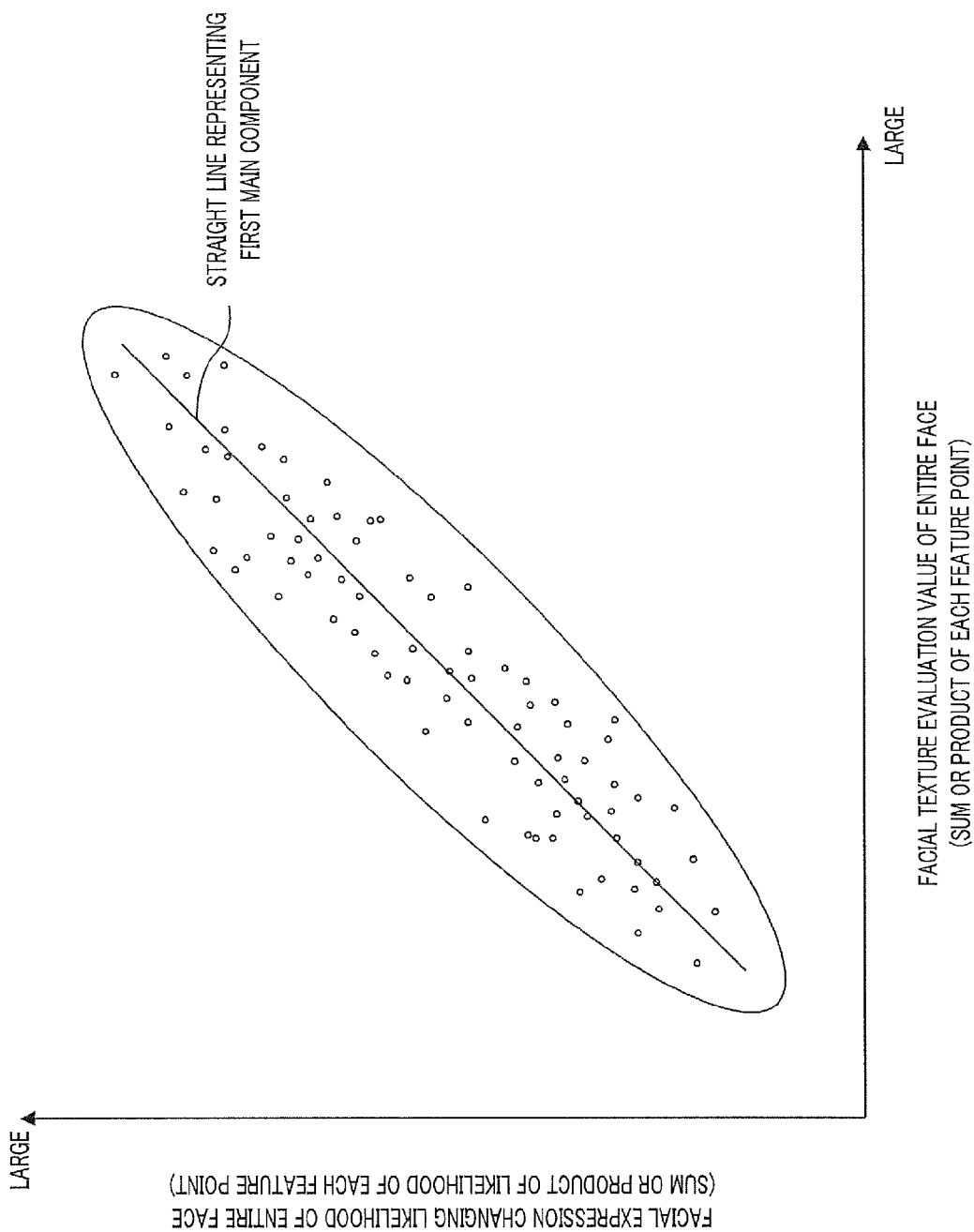
FIG. 7 illustrates a correlation between facial texture evaluation values and facial expression changing likelihood according to Embodiment 1 of the present invention.

If the facial expression of an input image has not significantly changed from the face shape in an expressionless state (or the face shape obtained a specific time ago, that is, the face shape used as the reference) used for calculating the facial expression changing likelihood, the relationship between the facial texture evaluation value and the facial expression changing likelihood is as follows. In the face shape candidate similar to an input image, both the facial texture evaluation value and the facial expression changing likelihood remain as high values, and in the face shape candidate significantly different from the input image, both the facial texture evaluation value and the facial expression changing likelihood are low values (see FIG. 7). Accordingly, among a facial texture evaluation value and facial expression changing likelihood, it is less likely that one is high and the other is low, and thus the sample set is distributed around the straight line representing the first main component (see FIG. 7).

In contrast, the facial expression of the input image has significantly changed from the expressionless face shape used for calculating the facial expression changing likelihood (or the face shape obtained a specific time ago, that is, the reference face shape), the face shape candidate which is not similar to the input image has a low facial texture evaluation value. Accordingly, both the facial texture evaluation value and the facial expression changing likelihood are low values (see FIG. 7) in a situation where the difference is not apparent on the input image (two-dimensional image), the sample set is not distributed in the way described above (see FIG. 7).

For example, the positions of the feature points of the face projected on the two-dimensional plane are approximately the same in the face shape in which the mouth is half open and the face shape in which the mouth is puckered. The two face shapes and the expressionless face shape, which is the reference face shape, are approximate on a two-dimensional image. Accordingly, on the input image (two-dimensional image), both of the facial texture evaluation values for the face shape candidates representing the two types of face shapes are high (see FIG. 8). Stated differently, on the two-dimensional image, the two-types of face shape candidates are difficult to distinguish from each other. Since the face shape with the mouth half open has a small change in expression from the expressionless face shape (the reference face shape), the facial expression changing likelihood becomes a high value (see FIG. 8). In contrast, since the face shape candidate with puckered lips has a significant change from the expressionless face shape, the facial expression changing likelihood from the expressionless face shape becomes a low value (see FIG. 8). Accordingly, in the case of face shape candidate with the mouth half open, the positions of the feature points are present around the straight line representing the first main components, and the correlation evaluation values are high values. In contrast, in the case of the face shape candidate with puckered lips, the sample set is distributed to the positions significantly away from the straight line representing the first main components, and thus the correlation evaluation value is a low value.

As described above, depending on the face shape (facial expression), the face shape that can be distinguished only by an evaluation value on the two-dimensional plane (facial texture evaluation value) (face shape candidate with high correlation evaluation value) and a face shape that cannot be distinguished only by an evaluation value on the two-dimensional plane (face shape candidate with low correlation evaluation value) are present. Accordingly, in order to distinguish the face shapes which are indistinguishable only by the evaluation value on the two-dimensional plane, face shape estimating apparatus 200 three-dimensionally measures a region in which the face shape candidate having a low correlation evaluation value is on the two-dimensional plane so as to check the actual three-dimensional shape.

Accordingly, measurement target extracting apparatus 100 extracts a face shape candidate that requires three-dimensional measurement (distance measurement) of the three-dimensional shape by the following processes (S106, S107).

In S106, determining section 106 determines whether or not the correlation evaluation value calculated in S105 is smaller than a predetermined threshold, for each face shape candidate.

In S107, extracting section 107 extracts the face shape candidate determined as having a correlation evaluation value smaller than the predetermined threshold in S106. The extracted face shape candidate is a target for three-dimensional measurement (three-dimensional ranging).

In S108, three-dimensional measuring section 202 measures (ranges) three-dimensional shape of the face shape candidate (a face shape candidate having a correlation evaluation value smaller than the threshold) extracted in S107.

In S109, re-evaluation section 203 calculates a new evaluation value based on a comparison result between the three-dimensional shape (measurement result) obtained in S108 and three-dimensional coordinates of each feature point in the face shape candidate and the facial texture evaluation value. For example, when comparing the three-dimensional shape (measurement result) and the three-dimensional coordinates of the feature point of the face shape candidate, re-evaluation section 203 first calculates the distance between the three-dimensional coordinates of the feature point of the face shape candidate and the three-dimensional coordinates obtained from the measurement result in the feature point projected on the two-dimensional plane for each feature point. Subsequently, re-evaluation section 203 calculates a sum of the distances calculated in the feature points and obtains a sum of the distances as a comparison result.

As described above, the new evaluation value is a value that replaces the shape candidate evaluation value, reflects the comparison result between the measurement result and the face shape candidate, and becomes a higher value the smaller the value of the comparison result is. Re-evaluation section 203 calculates new evaluation value r according to the following Equation 2, for example.

[2]

$$r = e_t \frac{1}{1+S} \qquad \text{(Equation 2)}$$

However, $e_t$ is a facial texture evaluation value, and S is a sum (comparison result) of the distance between the measurement result and the face shape candidate. Note that, Equation 2 is an equation for a case when the value of the facial expression changing likelihood is in a range from 0 to 1.

In S110, determining section 204 determines the estimated face shape for the input image based on the shape candidate evaluation values of all of the face shape candidates calculated in S104 and the new evaluation value calculated in S109. Determining section 204 determines the face shape candidate having the highest value among all of the evaluation values including the new evaluation values and the shape candidate evaluation values among the three-dimensional coordinates in all of the face shape candidates as an estimated shape.

In S111, face shape estimating apparatus 200 ends the process illustrated in FIG. 6 when the estimation of the face shape ends (S111: YES), and returns to the process in S101 when the estimation process of the face shape does not end (S111: NO).

Figure 8:
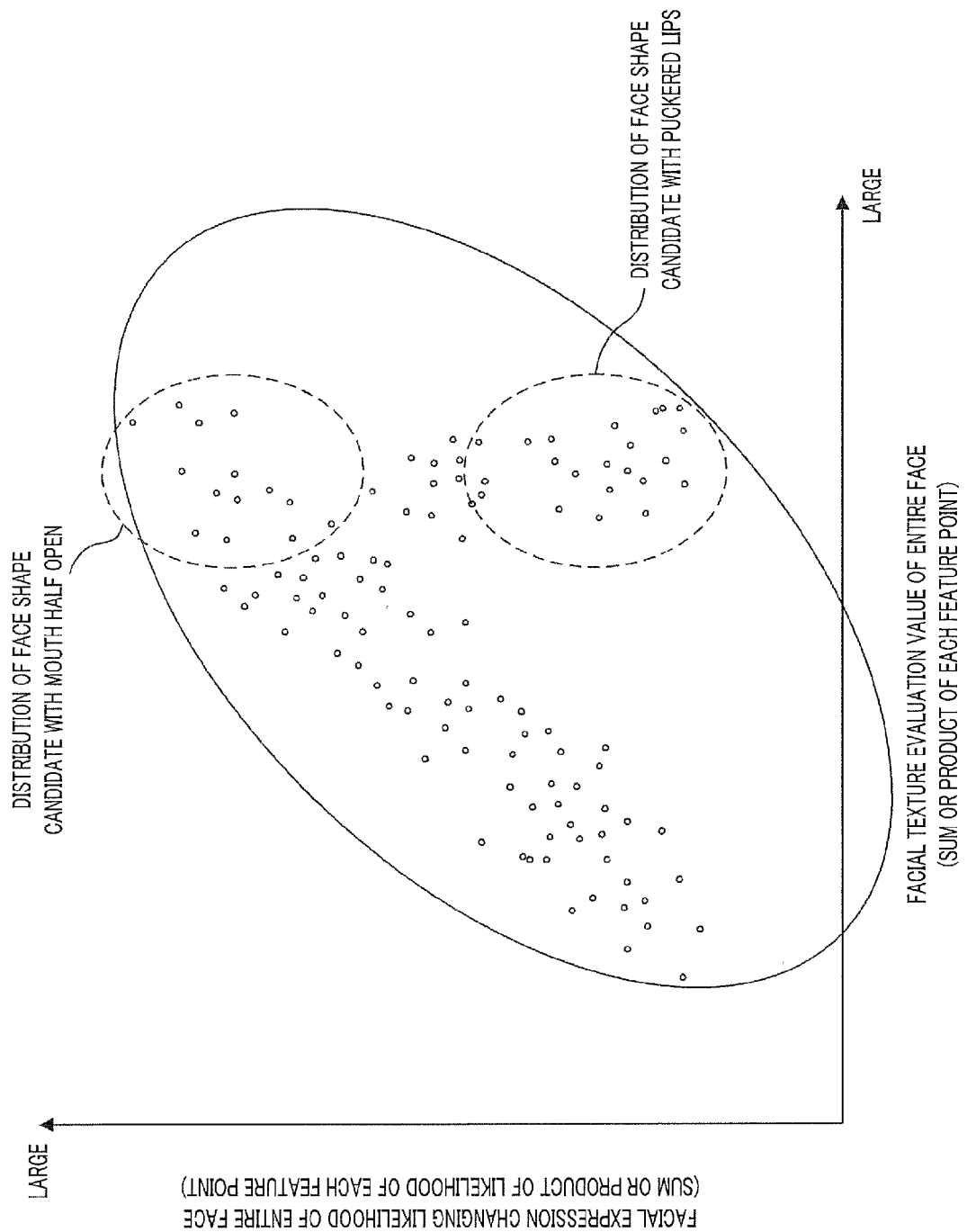
FIG. 8 illustrates a correlation between facial texture evaluation values and facial expression changing likelihood according to Embodiment 1 of the present invention.

As described above, in Embodiment 1, measurement target extracting apparatus 100 extracts a face shape candidate that cannot be distinguished from the two-dimensional image, and determines the face shape candidate as the target for measuring three-dimensional shape. More specifically, measurement target extracting apparatus 100 extracts a face shape candidate having a correlation evaluation value between the facial texture evaluation value and the facial expression changing likelihood lower than a threshold. For example, measurement target extracting apparatus 100 extracts a face shape candidate having a high facial texture evaluation value but low facial expression changing likelihood (for example, the face shape candidate with puckered lips as illustrated in FIG. 8).

In face shape estimating apparatus 200, the following operations are performed: shape candidate evaluation section 201 calculates a shape candidate evaluation value (first shape candidate evaluation value) based on the facial texture evaluation value and the facial expression changing likelihood (first likelihood) for each of the plurality of face shape candidates; three-dimensional measuring section 202 measures a three-dimensional shape of a face shape candidate extracted as the target to be measured by measurement target extracting apparatus 100; re-evaluation section 203 calculates a new evaluation value (second shape candidate evaluation value) using the three-dimensional shape, for each of the extracted face shape candidates; and determining section 204 determines a candidate to be an estimated shape for the facial image among the plurality of face shape candidates based on the shape candidate evaluation value (first shape candidate evaluation value) and new evaluation value (second shape candidate evaluation value).

Accordingly, face shape estimating apparatus 200 only have to measure (to perform distance measurement) the three-dimensional shape of the face shape candidate extracted by measurement target extracting apparatus 100. Stated differently, the target for three-dimensional distance measurement by face shape estimating apparatus 200 is determined by measurement target extracting apparatus 100. This operation eliminates the need for face shape estimating apparatus 200 to measure the three-dimensional shape on all of the face shape candidates, making it possible to remain the amount of calculation for measuring the three-dimensional shape at a low level.

Measurement target extracting apparatus 100 extracts a face shape candidate that cannot be distinguished only from a two-dimensional image, and face shape estimating apparatus 200 measures a three-dimensional shape for the face shape candidate extracted and re-evaluates a shape candidate evaluation value based on the measured three-dimensional shape.

For example, in FIG. 8, the face shape candidate with puckered lips which is the face shape candidate to be the target for the three-dimensional measurement has a high facial texture evaluation value but low facial expression changing likelihood. Accordingly, the shape candidate evaluation value calculated by shape candidate evaluation section 201 is smaller than that of the face shape candidate with the mouth half open. In contrast, a result of three-dimensional measurement on a face shape candidate with puckered lips by face shape estimating apparatus 200 shows that new evaluation value r may be greater than the shape candidate evaluation value of the face shape candidate with the mouth half open when the difference between the three-dimensional shape and the face shape candidate is small (distance S shown by Equation 2). In this case, determining section 204 determines the face shape candidate with puckered lips as an estimated shape for the input image. Stated differently, even if the shape candidate evaluation value for a face shape candidate calculated by the two-dimensional image is small, face shape estimating apparatus 200 calculates a high value as a new evaluation value corresponding to the shape candidate evaluation value if the difference from the input image is small as a result of checking the three-dimensional shape. In other words, face shape estimating apparatus 200 updates an evaluation value of the face shape candidate to be the target for three-dimensional shape measurement from a shape candidate evaluation value to a new evaluation value.

This operation makes it possible to highly accurately estimate the shape of face having a stereoscopic change in expression that is difficult to detect stably using only on the two-dimensional image.

According to Embodiment 1, the shape of a face having a stereoscopic change in expressions difficult to detect using only a two-dimensional image can be estimated highly accurately with a low amount of calculation.

Embodiment 2

[Configuration of Measurement Target Extracting Apparatus 300]

Figure 9:
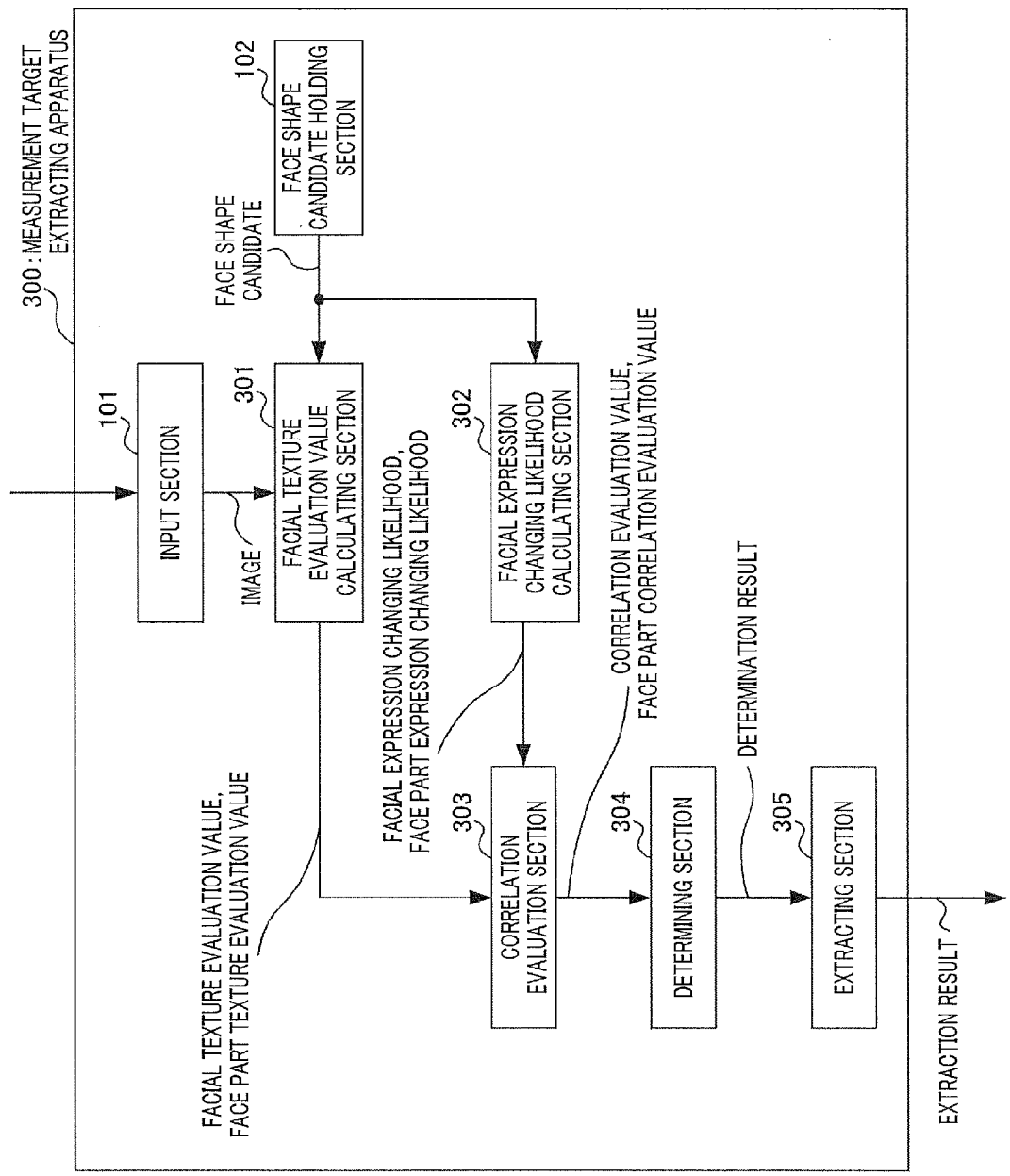
FIG. 9 is a block diagram illustrating a configuration of a measurement target extracting apparatus according to Embodiment 2 of the present invention.

FIG. 9 is a block diagram illustrating a configuration of measurement target extracting apparatus 300 according to Embodiment 2. Note that, in FIG. 9, the same reference numerals are assigned to the components identical to those in Embodiment 1 (FIG. 2), and the description for these components is omitted.

In FIG. 9, in addition to the process identical to the process performed by facial texture evaluation value calculating section 103 (calculating a facial texture evaluation value), facial texture evaluation value calculating section 301 compares an image input from input section 101 (input image) and each face part of a face shape candidate input from face shape candidate holding section 102, to calculate an evaluation value for each face part (face part texture evaluation value). The term "face part texture evaluation value" refers to a value calculated for each feature point of the face shape candidate or a face part such as an eye or a nose, and represents a degree of match between the input image and the face shape candidate in a region corresponding to each face part.

For example, facial texture evaluation value calculating section 301 first calculates two-dimensional coordinates on an input image plane of each feature point by projecting each feature point of the face shape candidate on the input image. Subsequently, facial texture evaluation value calculating section 301 calculates a degree of match between the input image around the two-dimensional coordinates calculated (texture) and texture of each feature point in the face part of the face shape candidate. The degree of match is calculated by the sum of absolute difference (SAD) or the normalized cross-correlation.

Note that, facial texture evaluation value calculating section 301 may represent a facial texture evaluation value as a sum of all of face part texture evaluation values of all face parts, instead of representing the facial texture evaluation value as a degree of match of texture in the entire face, as described in Embodiment 1.

Facial expression changing likelihood calculating section 302 performs a process to calculate, for each face part in the face shape candidate input from face shape candidate holding section 102, face part expression changing likelihood, in addition to the process identical to the process performed by facial expression changing likelihood calculating section 104 (calculating facial expression changing likelihood). The term "face part expression changing likelihood" refers to a value representing how natural each face part in the face shape candidate (that is, a value representing how natural, as a shape of a face, a change in the shape of face part is).

More specifically, for each of the face parts of the face shape candidate, facial expression changing likelihood calculating section 302 calculates face part expression changing likelihood as likelihood between a face part of the reference face shape and the face part of the face shape candidate. For example, facial expression changing likelihood calculating section 302 may determine a value of a function inversely proportional to a distance between coordinates of each feature point in the face shape obtained a specific time ago (reference face shape) and coordinates of a feature point corresponding to the face part of the face shape candidate as face part expression changing likelihood of the face part. Alternatively, facial expression changing likelihood calculating section 302 determines a value of a function inversely proportional to a distance between each face part in the expressionless face shape (the reference face shape) obtained in advance and coordinates of a feature point corresponding to the face part in the face shape candidate as face part expression changing likelihood of the face part.

In addition to the same process as correlation evaluation section 105 (calculation of a correlation evaluation value), correlation evaluation section 303 performs a process to calculate a face part correlation evaluation value representing a degree of correlation between a face part texture evaluation value input from facial texture evaluation value calculating section 301 and face part expression changing likelihood input from facial expression changing likelihood calculating section 302. As described above, in measurement target extracting apparatus 300, in addition to a correlation evaluation value of the entire face, a face part correlation evaluation value representing a correlation between the face part texture evaluation value and the face part expression changing likelihood is calculated for each face part.

Determining section 304 determines whether or not the correlation evaluation value of each face shape candidate input from correlation evaluation section 303 is smaller than a predetermined threshold. Furthermore, determining section 304 determines, for a face shape candidate having a correlation evaluation value smaller than the predetermined threshold, whether or not a face part correlation evaluation value of the face part is smaller than a predetermined threshold. Determining section 304 outputs the determination result to extracting section 305.

Extracting section 305 extracts, based on the determination result by determining section 304, only a face part having a face part correlation evaluation value lower than the threshold as a target for measuring a three-dimensional shape among face parts in the face shape candidate having correlation evaluation values lower than the threshold in face shape candidates held by face shape candidate holding section 102.

[Configuration of Face Shape Estimating Apparatus 400]

Figure 10:
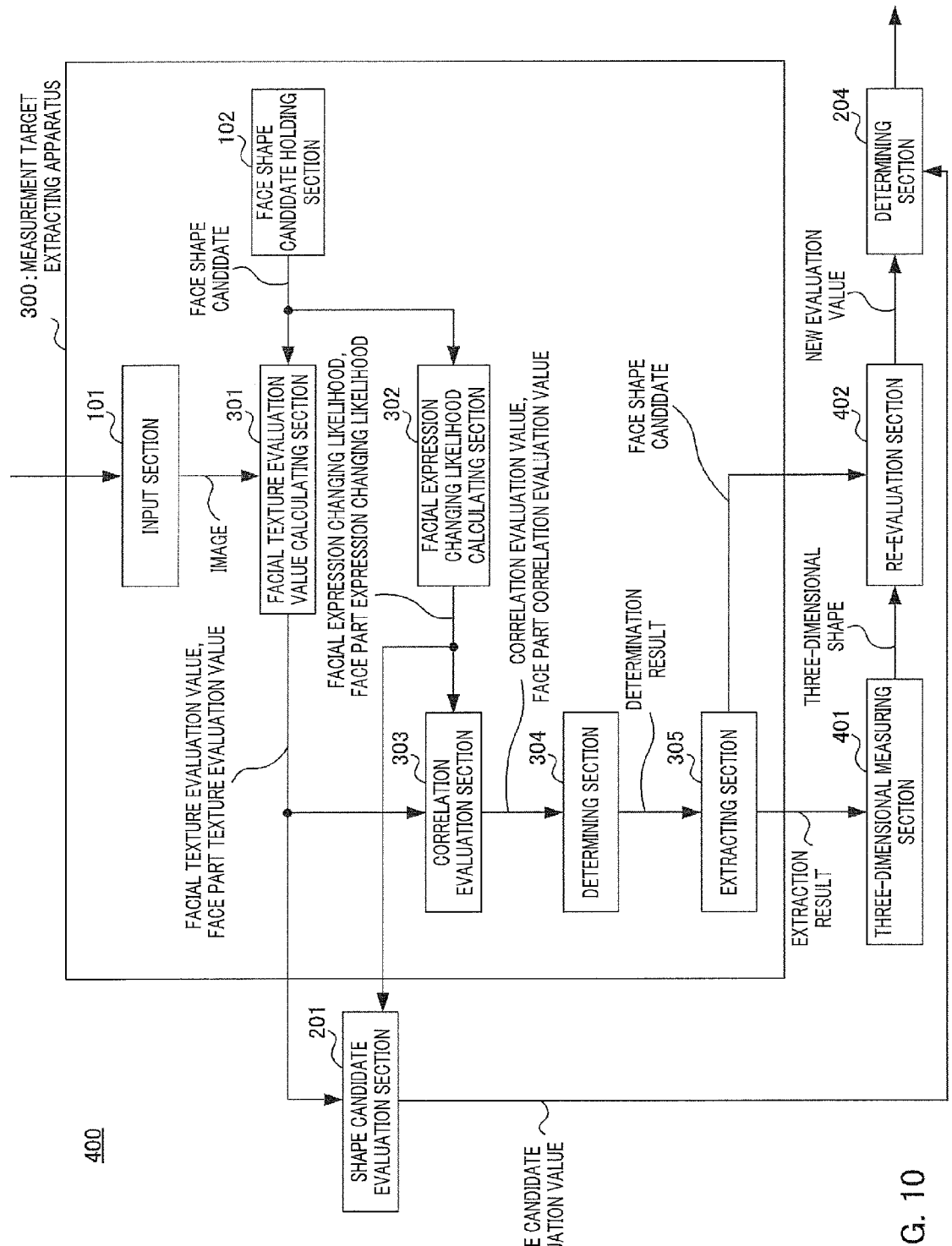
FIG. 10 is a block diagram illustrating a configuration of a face shape estimating apparatus according to Embodiment 2 of the present invention.

FIG. 10 is a block diagram illustrating a configuration of face shape estimating apparatus 400 according to Embodiment 2. Note that, in FIG. 10, the same reference numerals are assigned to the components identical to those in Embodiment 1 (FIG. 5), and the description for these components is omitted.

In FIG. 10, three-dimensional measuring section 401 measures (performs distance measurement) only the face part of the face shape candidate extracted by extracting section 305 in measurement target extracting apparatus 300.

Re-evaluation section 402 calculates a new evaluation value using a three-dimensional shape (measurement result) measured by three-dimensional measuring section 401. Stated differently, re-evaluation section 402 calculates a new evaluation value for a face shape candidate including the face part by comparing the three-dimensional shape of the face part and the face part of the face shape candidate.

[Operation of Face Shape Estimating Apparatus 400]

Figure 11:
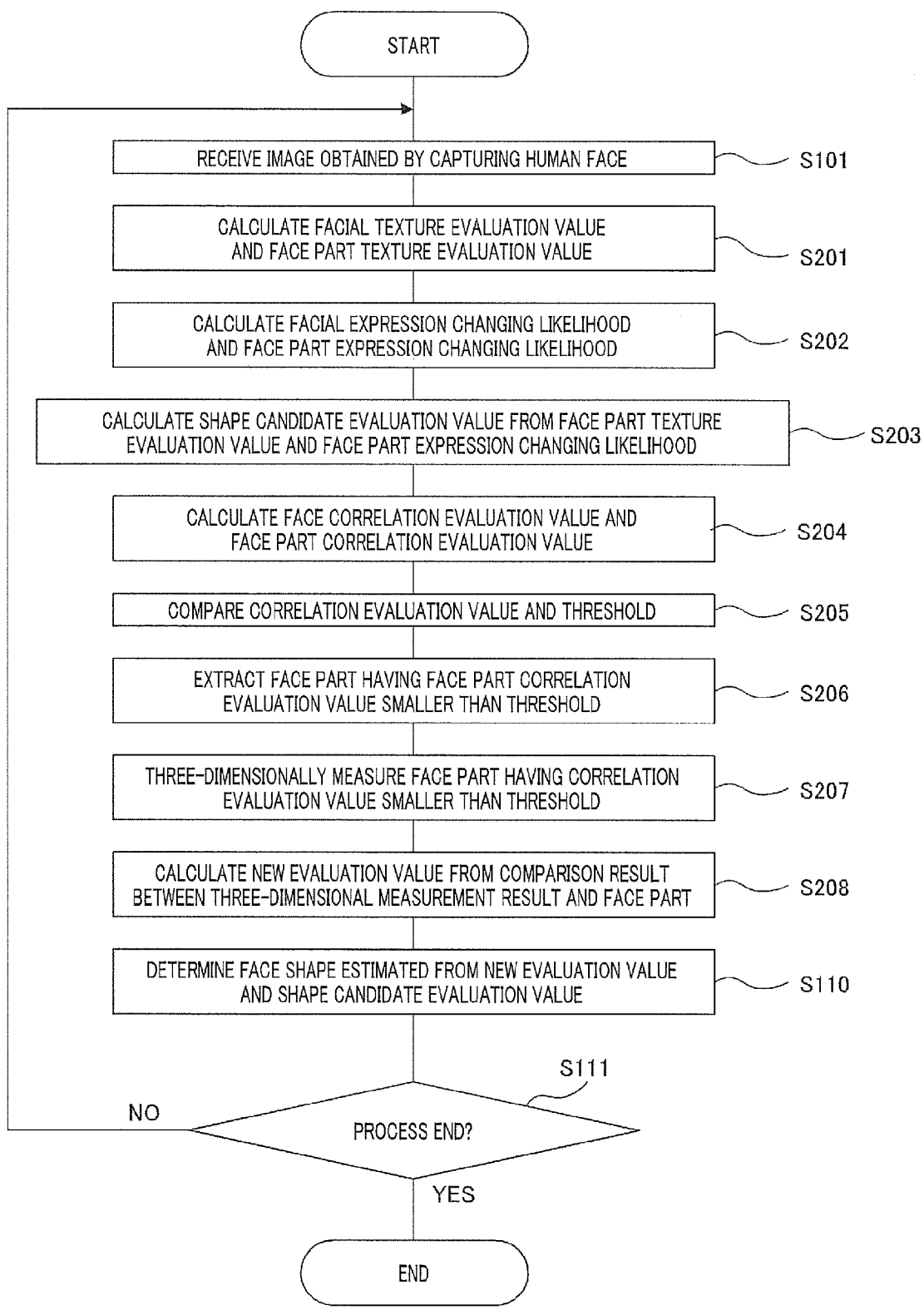
FIG. 11 is a flowchart illustrating operations of a face shape estimating apparatus according to Embodiment 2 of the present invention.

The operation of face shape estimating apparatus 400 having the configuration described above will be described. FIG. 11 is a flowchart illustrating a process for estimating the face shape by face shape estimating apparatus 400. Note that, in FIG. 11, the same reference numerals are assigned to the components identical to those in Embodiment 1 (FIG. 6), and the description for these components is omitted.

In S201 illustrated in FIG. 11, facial texture evaluation value calculating section 301 calculates a facial texture evaluation value of each face shape candidate, and a face part texture evaluation value for each face part in each face shape candidate.

In S202, facial expression changing likelihood calculating section 302 calculates facial expression changing likelihood of each face shape candidate and face part expression changing likelihood for each face part of each face shape candidate.

In S203, shape candidate evaluation section 201 calculates a shape candidate evaluation value of the face shape candidate using a face part texture evaluation value calculated in S201 and face part expression changing likelihood calculated in S202, for example. For example, the shape candidate evaluation value is calculated as a sum of products of face part texture evaluation values of each face part and face part expression changing likelihood. Note that, in the same manner as Embodiment 1, shape candidate evaluation section 201 may calculate a shape candidate evaluation value of the face shape candidate using the facial texture evaluation value calculated in S201 and facial expression changing likelihood calculated in S202.

In S204, correlation evaluation section 303 calculates correlation evaluation value e between facial texture evaluation value calculated in S201 and facial expression changing likelihood calculated in S202, and face part correlation evaluation value $e_p$ between the face part texture evaluation value of each face part calculated in S201 and the face part expression changing likelihood calculated in S202.

Face part correlation evaluation value $e_p$ is calculated in the same manner as the calculation for correlation evaluation value e in Embodiment 1. More specifically, correlation evaluation section 303 first calculates first main components using a plurality of face part texture evaluation values and face part expression changing likelihood of a plurality of face shape candidates as a sample set and using the face part texture evaluation value and face part expression changing likelihood as variables, and obtains a straight line representing the first main components. Note that, correlation evaluation section 303 may use a proportional straight line of a facial texture evaluation value and facial expression changing likelihood obtained in advance, instead of a straight line representing the first main component. Subsequently, correlation evaluation section 303 calculates distance $d_p$ between a straight line which represents the first main components and the face shape candidate which is an evaluation target (face part). Correlation evaluation section 303 calculates face part correlation evaluation value $e_p$ according to the following Equation 3.

[3]

$$e_p = \frac{1}{1 + d_p} \quad \text{(Equation 3)}$$

In S205, determining section 304 determines whether or not a correlation value calculated in S204 for each face shape candidate is smaller than the predetermined threshold. Furthermore, determining section 304 determines, for each face part of a face shape candidate having a correlation evaluation value, whether or not the face part correlation evaluation value calculated in S204 is smaller than a predetermined threshold.

In S206, extracting section 305 extracts a face part determined as having a face part correlation evaluation value smaller than a predetermined threshold in S205. Stated differently, among face parts of the face shape candidate having the correlation evaluation value smaller than a threshold, a face part having a face part correlation evaluation value smaller than a threshold will be a target for three-dimensional measurement (three-dimensional distance measurement).

Note that, as a target for three-dimensional measurement, extracting section 305 may select all of the face parts having a face part correlation evaluation value $e_p$ smaller than a threshold in face shape candidates having a correlation value smaller than a threshold, for example. Alternatively, in a face shape candidate having a correlation evaluation value smaller than a threshold, extracting section 305 may select, from face parts having face part correlation evaluation values $e_p$ lower than the threshold, a number of face parts corresponding to a predetermined proportion of the total number of the face parts in ascending order of face part correlation evaluation values $e_p$, and extracts the selected face part as a target for three-dimensional measurement.

In S207, three-dimensional measuring section 401 measures (performs distance measurement) a three-dimensional shape only for a region of a face part (a face part having a face part correlation evaluation value smaller than the threshold) in the face shape candidate extracted in S206. Note that, the method for performing distance measurement on the face part may be identical to the method in Embodiment 1.

In S208, re-evaluation section 402 compares a three-dimensional shape of the face part obtained in S206 (measurement result) and each face part in the face shape candidate, and calculates a new evaluation value based on the comparison result.

Re-evaluation section 402 calculates, for each feature point, a distance between three-dimensional coordinates of a feature point in each face part in the face shape candidate and three-dimensional coordinates obtained from a measurement result in a feature point projected on a two-dimensional plane, for example. Subsequently, re-evaluation section 402 obtains a distance calculated for each feature point as a comparison result. In this process, re-evaluation section 402 compares the measurement result and three-dimensional coordinates of a feature point only on a feature point included in a face part in which three-dimensional shape is measured (distance measurement is performed).

In the same manner as Embodiment 1, the new evaluation value is a value that replaces the shape candidate evaluation value reflecting the comparison result between the measurement result and the face shape candidate, and becomes a higher value the smaller the value of the comparison result is. Re-evaluation section 402 calculates new evaluation value r according to the following Equation 4, for example.

[4]

$$r = r' + \sum e_{tp} \frac{1}{1 + S_p} \quad \text{(Equation 4)}$$

However, r' denotes a sum of a product of a face part texture evaluation value and face part expression changing likelihood of a face part in which a three-dimensional shape has not been measured. In Equation 4, $e_{tp}$ denotes a facial texture evaluation value of each face part whose three-dimensional shape is measured, and $S_p$ denotes a distance between the measurement result of each face part whose three-dimensional shape is measured and the feature point of the face part. Note that, Equation 4 is an equation for a case when the value of the facial expression changing likelihood is in a range from 0 to 1.

As described above, in Embodiment 2, measurement target extracting apparatus 300 performs the evaluation on the entire face, as well as each face part. With this, in the same manner as Embodiment 1, the face shape candidate for measuring the three-dimensional shape in face shape estimating apparatus 200 can be limited. Furthermore, according to Embodiment 2, in a face shape candidate to be a measurement target of the three-dimensional shape, face parts to be the target for three-dimensional measurement are limited further. With the process described above, the amount of calculation can be reduced further, and the face shape can be estimated highly accurately compared with Embodiment 1.

Embodiment 3

Figure 12:
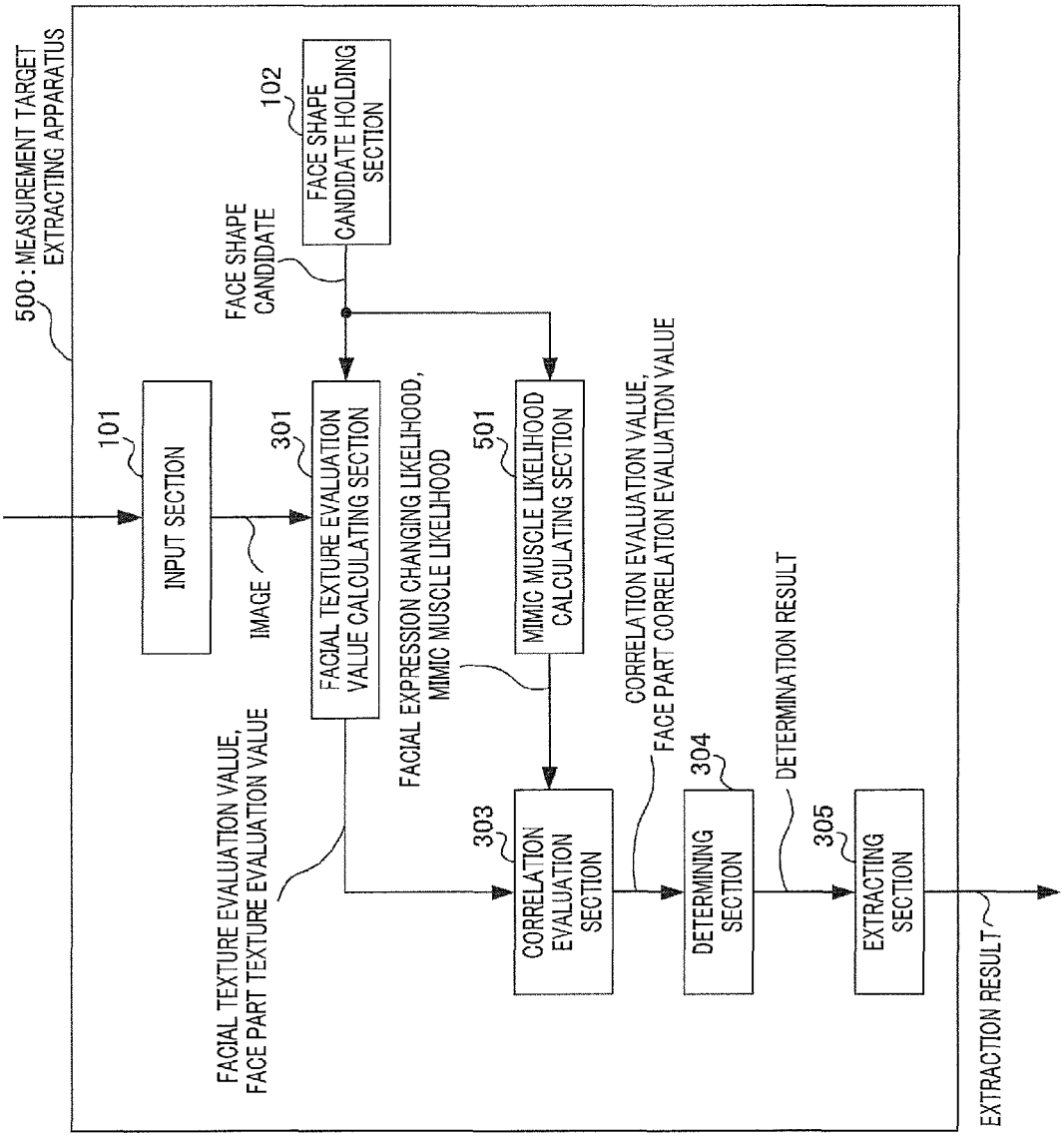
FIG. 12 is a block diagram illustrating a configuration of a measurement target extracting apparatus according to Embodiment 3 of the present invention.

FIG. 12 is a block diagram illustrating a configuration of measurement target extracting apparatus 500 according to Embodiment 3. Note that, in FIG. 12, the same reference numerals are assigned to the components identical to those in Embodiment 2 (FIG. 9), and the description for these components is omitted. Measurement target extracting apparatus 500 illustrated in FIG. 12 includes mimic muscle likelihood calculating section 501, instead of facial expression changing likelihood calculating section 302, as compared with Embodiment 2 (FIG. 9).

In FIG. 12, mimic muscle likelihood calculating section 501 calculates, using a face shape candidate input from face shape candidate holding section 102, mimic muscle likelihood for each face part, based on a movable range of a mimic muscle for moving each face part included in the face shape candidate. The "mimic muscle likelihood" represents a degree of match between the position of each face part in the face shape candidate and a movable range of a mimic muscle for moving each face part.

Figure 13:
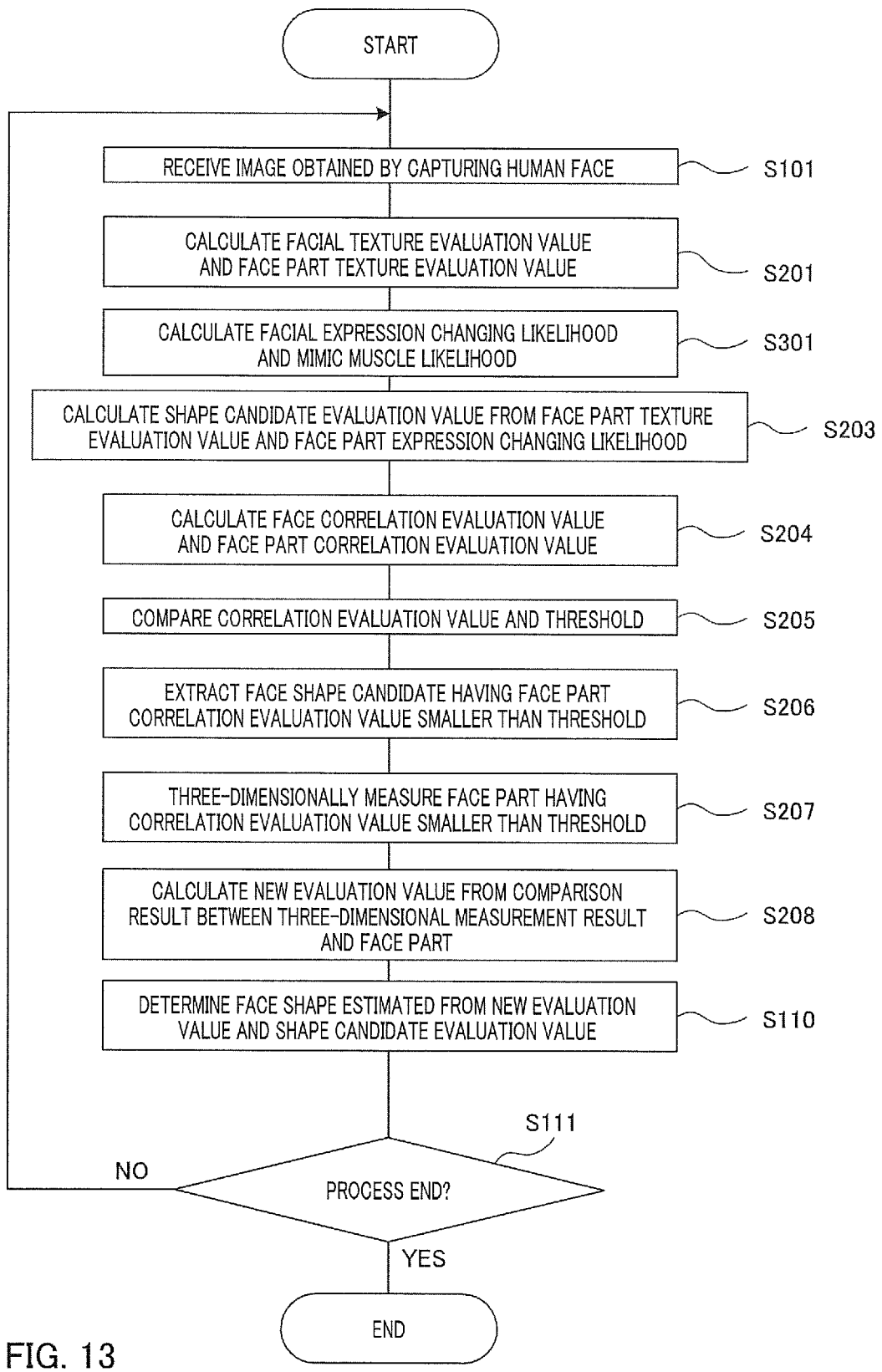
FIG. 13 is a flowchart illustrating operations of a face shape estimating apparatus according to Embodiment 3 of the present invention.

FIG. 13 is a flowchart illustrating a process for estimating the face shape by face shape estimating apparatus according to Embodiment 3. Note that the face shape estimating apparatus according to Embodiment 3 is different from face shape estimating apparatus 400 according to Embodiment 2 (FIG. 10) only in that measurement target extracting apparatus 500 (FIG. 12) is included instead of measurement target extracting apparatus 300 (FIG. 9). Accordingly, detailed description for the face shape estimating apparatus is omitted. Note that, in FIG. 13, the same reference numerals are assigned to the components identical to those in Embodiment 2 (FIG. 11), and the description for these components is omitted.

In S301, mimic muscle likelihood calculating section 501 calculates facial expression changing likelihood and mimic muscle changing likelihood of the face shape candidate, based on a range of movement of the mimic muscle for moving each face part.

Mimic muscles are muscles for changing expressions on the face and used as a generic name for muscles such as the orbicularis oculi muscle, the zygomaticus major muscle, and the like. In Embodiment 3, measurement target extracting apparatus 500 obtains a direction in which a mimic muscle for moving each feature point of the face shape candidate in advance. Mimic muscle likelihood calculating section 501 compares the position of the feature point of the reference face shape and a feature point of each face part in the face shape candidate, and calculates a value representing a degree of match between an actual movement direction (and distance) from the feature point of the reference face shape to the position of the face part and the movable range of the mimic muscle for moving each face part as mimic muscle likelihood, instead of the face part expression changing likelihood in Embodiment 2.

More specifically, facial muscle likelihood calculating section 501 calculates the mimic muscle likelihood as described below.

When obtaining a contracting/extending direction of the mimic muscle, mimic muscle likelihood calculating section 501 calculates, for each mimic muscle for moving the feature point in the face shape candidate, a straight line connecting end points where the mimic muscles are attached the skeleton in a person having a head with a standard shape, for example. Subsequently, mimic muscle likelihood calculating section 501 obtains a unit vector parallel to the calculated straight line as a contracting/extending direction of the mimic muscle. However, when there are a plurality of mimic muscles for moving one feature point, mimic muscle likelihood calculating section 501 obtains all of contracting/extending directions of the plurality of the mimic muscles as a contracting/extending direction (unit vector) of the mimic muscle moving the feature point.

Subsequently, when calculating the mimic muscle likelihood, mimic muscle likelihood calculating section 501 calculates an angle formed by (i) a vector connecting a feature point in the reference face shape and the feature point of the face shape candidate and (ii) a unit vector obtained as the contracting/extending direction of the mimic muscle as $\theta$ (see FIG. 14) in each feature point, and calculates mimic muscle likelihood k shown in the following Equation 5.

[5]

$$k = \frac{1}{1+m}\cos\theta \qquad \text{(Equation 5)}$$

Figure 14:
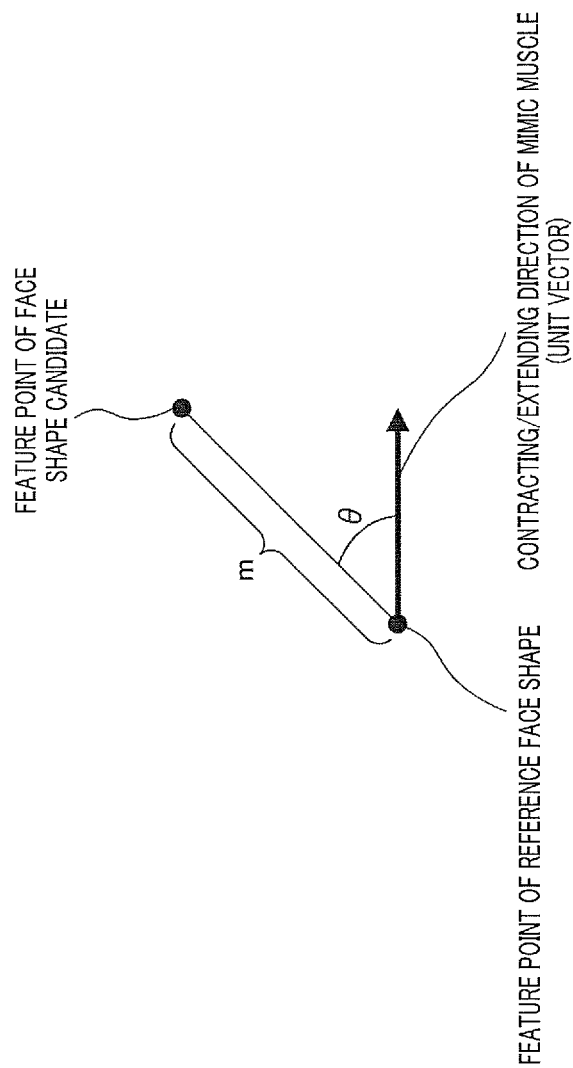
FIG. 14 is a diagram for describing a method for calculating mimic muscle likelihood according to Embodiment 3 of the present invention.

However, m is an absolute value of a vector connecting a feature point of the reference face shape and a feature point of the face shape candidate (see FIG. 14). Note that, the reference face shape may be a face shape estimation result estimated a specific time ago, and may be an expressionless face shape obtained in advance. Moreover, when there are a plurality of mimic muscles for moving the feature point, mimic muscle likelihood calculating section 501 calculates k shown in Equation 5 for the vectors in all of the contracting/extending directions, and determines the largest value among the calculated k as the mimic muscle likelihood of the feature point.

According to Equation 5, the more the feature point moves to a direction different from the contracting/extending direction of the mimic muscle (the larger $\theta$ becomes), the smaller the value of mimic muscle likelihood k becomes (k becomes its smallest value when $\theta=90°$). In addition, according to Equation 5, the larger the movement amount for the reference of the feature point in the face shape candidate is (the larger m becomes), the smaller the value of mimic muscle likelihood k becomes. Stated differently, the value of mimic muscle likelihood k becomes small when the amount of change from the reference face shape is large, in the same manner as facial expression changing likelihood.

As described above, in Embodiment 3, measurement target extracting apparatus 500 defines the direction and the range where the feature point moves by a mimic muscle, which actually controls the movement of the feature point, and obtains a degree of match of the mimic muscle with the feature point of the face shape candidate as the mimic muscle likelihood. Accordingly, in the same manner as facial expression changing likelihood in Embodiments 1 and 2, the degree of naturalness represented by the face shape as a face is precisely represented as mimic muscle likelihood, so that it is possible to improve the estimation accuracy of the face shape in Embodiment 3.

Embodiment 4

Figure 15:
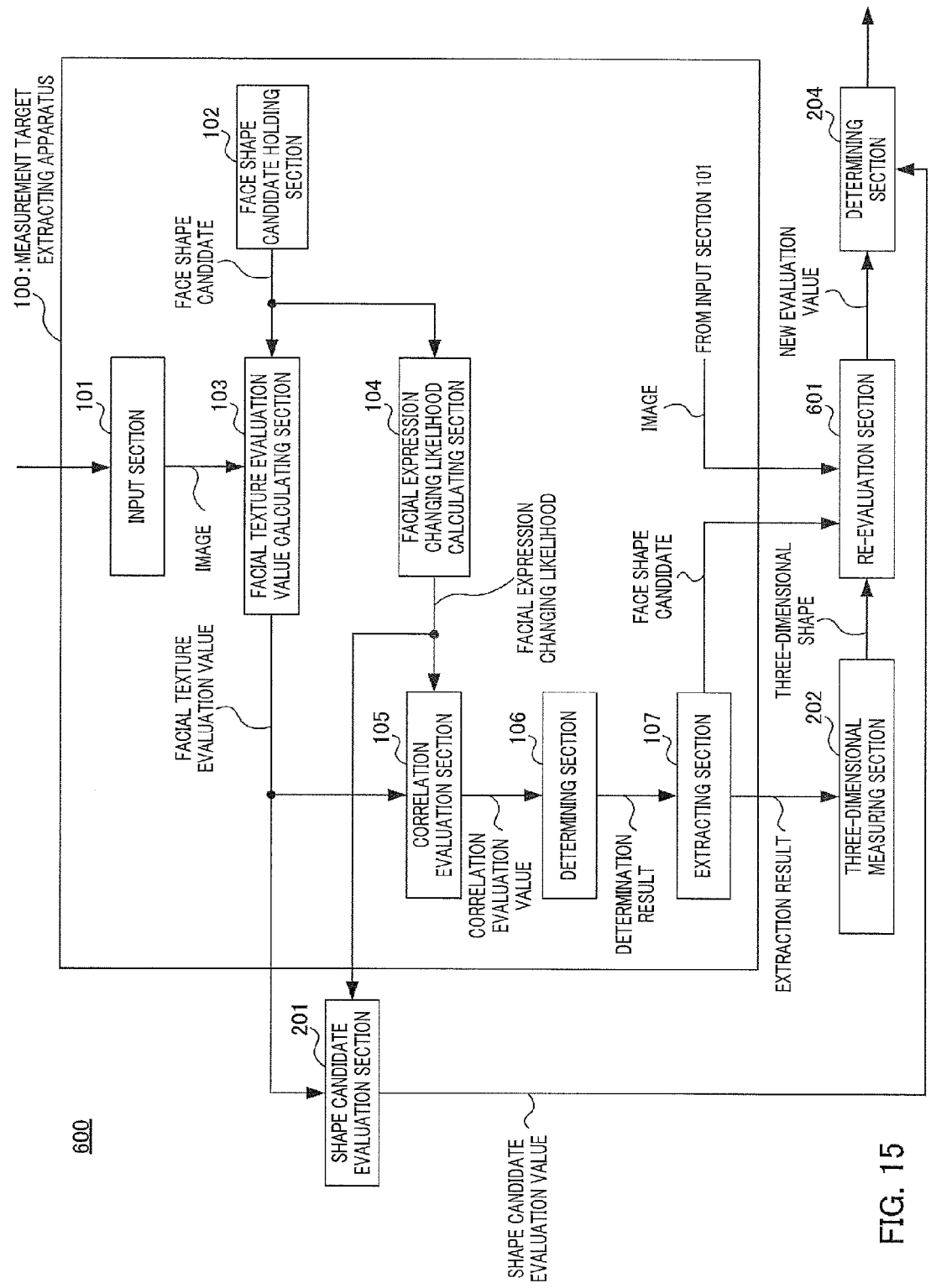
FIG. 15 is a block diagram illustrating a configuration of a face shape estimating apparatus according to Embodiment 4 of the present invention.

FIG. 15 is a block diagram illustrating configuration of face shape estimating apparatus 600 according to Embodiment 4. Note that, in FIG. 15, the same reference numerals are assigned to the components identical to those in Embodiment 1 (FIG. 5), and the description for these components is omitted.

In FIG. 15, re-evaluation section 601 generates a new face shape candidate from a measurement result input from three-dimensional measuring section 202 and an image input from input section 101 (input image) and adds the new face shape candidate to a face shape candidate group. In addition, re-evaluation section 601 calculates, as the new evaluation value, a shape candidate evaluation value similar to a value obtained by shape candidate evaluation section 201 for a new face shape candidate added to the face shape candidate group.

Figure 16:
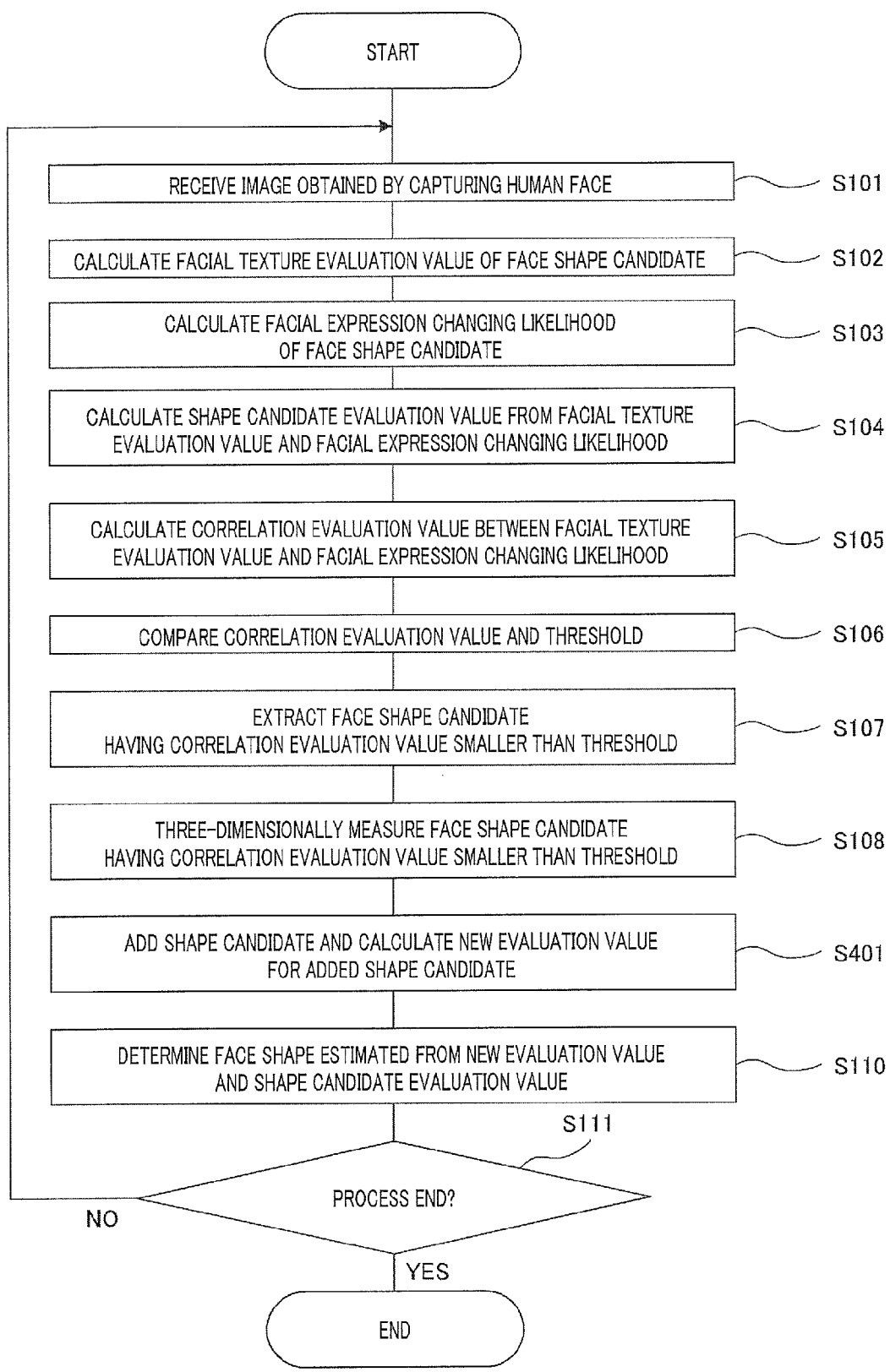
FIG. 16 is a flowchart illustrating operations of a face shape estimating apparatus according to Embodiment 4 of the present invention.

FIG. 16 is a flowchart illustrating a process for estimating the face shape by face shape estimating apparatus 600. Note that, in FIG. 16, the same reference numerals are assigned to the components identical to those in Embodiment 1 (FIG. 6), and the description for these components is omitted.

In S401 illustrated in FIG. 16, re-evaluation section 601 sets a depth of the feature point of the face shape candidate projected on an input image plane, using the measurement result obtained in S108, and obtains three-dimensional coordinates of a feature point of the face shape candidate after the setting as three-dimensional coordinates of the feature point of the new face shape candidate. With this operation, the new face shape candidate is added to the face shape candidate group.

Subsequently, re-evaluation section 601 sets a texture corresponding to a feature point which is the original of the new face shape candidate as a texture of the new face shape candidate. Re-evaluation section 601 sets a facial texture evaluation value on a face shape candidate which is the original of the new face shape candidate as a facial texture evaluation value to the new face shape candidate. Re-evaluation section 601 sets facial expression changing likelihood for the new face shape candidate as the largest possible value. Subsequently, re-evaluation section 601 calculates a shape candidate evaluation value (for example, a product or a sum of the facial texture evaluation value and facial expression changing likelihood), using the facial texture evaluation value and the facial expression changing likelihood that are set. Note that, when facial expression changing likelihood is a real value between −1 and 1, the largest possible value is 1, which is the largest value, for example.

As described above, in Embodiment 4, face shape estimating apparatus 600 adds a new face shape candidate reflecting the measurement result of the three-dimensional shape on coordinates of the feature point. With this, face shape estimating apparatus 600 can improve the accuracy in estimating the face shape by estimating the face shape using the face shape candidate in consideration of the actual measurement value of the three-dimensional shape.

Embodiments of the present invention have been described thus far.

Note that, the function of each component in the face shape estimating apparatus according to each of the embodiments may be implemented by a microcomputer executing a control program. For example, face shape estimating apparatus may include a CPU which is a control section, a ROM in which the control program is recorded, a RAM for executing the program, a camera which is an image capturing apparatus, a projector, and a display section which is a projector, and a display and alert apparatus. The control section may control the operation of each component of the face shape estimating apparatus. Each component illustrated in FIGS. 5, 10, and 15 clearly specifies the face shape estimation process performed by the control section as a block.

In addition, the face shape estimating apparatus (FIGS. 5, 10, and 15) is useful as an information providing apparatus mounted on an information terminal such as a personal computer, an OA device, or a mobile phone, or a transportation device such as an automobile, an aircraft, a ship, a train, or the like. Alternatively, face shape estimating apparatus (FIGS. 5, 10, and 15) may be used for a monitoring and alert apparatus, a robot, an audio-video reproduction apparatus, or the like.

A measurement target extracting apparatus according this disclosure is an apparatus that extracts a candidate for a three-dimensional shape measurement target among a plurality of face shape candidates, the apparatus including: a facial texture evaluation value calculating section that calculates, for each of the plurality of face shape candidates, a facial texture evaluation value representing a degree of match between an input face image and a texture of the face shape candidate; a likelihood calculating section that calculates, for each of the plurality of face shape candidates, first likelihood between a reference face shape and the face shape candidate; a correlation evaluation section that calculates, for each of the plurality of face shape candidates, a first correlation evaluation value representing a degree of correlation between the facial texture evaluation value and the first likelihood; and an extracting section that extracts, from the plurality of face shape candidates, a face shape candidate having the first correlation evaluation value lower than a first threshold, as the measurement target.

In the measurement target extracting apparatus according to this disclosure: the facial texture evaluation value calculating section calculates the facial texture evaluation value, and calculates, for each of face parts of the face shape candidate, a face part texture evaluation value representing a degree of match between the facial image and the face part; the likelihood calculating section calculates the first likelihood, and calculates, for each of the face parts in the face shape candidate, second likelihood between the reference face shape and the face part; the correlation evaluation section calculates the first correlation evaluation value, and calculates, for each of the face parts in the face shape candidate, a second correlation evaluation value representing a degree of correlation between the face part texture evaluation value and the second likelihood; and the extracting section extracts, from face parts in a face shape candidate having the first correlation evaluation value lower than the first threshold, a face part having a second correlation value lower than a second threshold, as a measurement target.

In the measurement target extracting apparatus according to this disclosure, the extracting section selects, from face parts having the second correlation evaluation values lower than the second threshold, a number of face parts corresponding to a predetermined proportion of to a total number of the face parts in ascending order of the second correlation values, and extracts the selected face parts as the measurement target.

In the measurement target extracting apparatus according to this disclosure, the likelihood calculating section calculates, for each of the plurality of face shape candidates, the first likelihood representing an amount of change between three-dimensional coordinates of a plurality of feature points representing the face shape candidate and three-dimensional coordinates at positions corresponding to the plurality of feature points in the reference face shape.

In the measurement target extracting apparatus according to this disclosure, the likelihood calculating section calculates the first likelihood representing a degree of match between the position of the face part in the face shape candidate and a movable range of mimic muscles for moving the face part, by comparing the position of the face part in the face shape candidate and a position of the reference face shape.

In the measurement target extracting apparatus according to this disclosure, the reference face shape is an expressionless face shape.

In the measurement target extracting apparatus according to this disclosure, the reference face shape is a face shape obtained a specific time ago.

A face shape estimating apparatus according to this disclosure includes: the measurement target extracting apparatus; a three-dimensional shape measuring section that measures a three-dimensional shape of a face shape candidate extracted as the measurement target by the measurement target extracting apparatus; a shape candidate evaluation section that calculates a first shape candidate evaluation value for each of the plurality of face shape candidates, based on the facial texture evaluation value and the first likelihood; a re-evaluation section that calculates, for each of the plurality of extracted face shape candidates, a second shape candidate evaluation value, using the three-dimensional shape; and a determining section that determines an estimated shape of the facial image from the plurality of face shape candidates based on the first shape candidate evaluation value and the second shape candidate evaluation value.

In the face shape estimating apparatus according to this disclosure, in the measurement target extracting apparatus, the facial texture evaluation value calculating section calculates the face texture evaluation value, and calculates, for each of face parts in the face shape candidate, a face part texture evaluation value representing a degree of match between the facial image and the face part; the likelihood calculating section calculates the first likelihood, and calculates, for each of the face parts in the face shape candidate, second likelihood between the reference face shape and the face part; the correlation evaluation section calculates the first correlation evaluation value, and calculates, for each of the face parts in the face shape candidate, a second correlation evaluation value representing a degree of correlation between the face part texture evaluation value and the second likelihood; and the extracting section extracts, from face parts in a face shape candidate having the first correlation evaluation value lower than the first threshold, a face part having the second correlation value lower than a second threshold, as the measurement target; the three-dimensional shape measuring section measures a three-dimensional shape of the face part extracted by the extracting section; and the re-evaluation section calculates the second shape candidate evaluation value, using the three-dimensional shape of the face part.

In the face shape estimating apparatus according to this disclosure, the re-evaluation section calculates, for each of the extracted face shape candidates, the second shape candidate evaluation value based on the facial texture evaluation value and a result of comparison between the three-dimensional shape and three-dimensional coordinates of the face shape candidate.

In the face shape estimating apparatus according to this disclosure, the re-evaluation section generates a new face shape candidate using the extracted face shape candidate and information regarding the three-dimensional shape, and calculates the second shape candidate evaluation value corresponding to each of the new face shape candidates, based on the facial texture evaluation value and the first likelihood that correspond to the new face shape candidate.

In the face shape estimating apparatus according to this disclosure, the determining section determines, as the estimated shape, a face shape candidate corresponding to the largest value among the first shape candidate evaluation value and the second shape candidate evaluation value.

In the face shape estimating apparatus according to this disclosure, the determining section determines the estimated shape by calculating a weighted average of the plurality of face shape candidates, based on a weight calculated using the first shape candidate evaluation value and the second shape candidate evaluation value.

A measurement target extracting method according to this disclosure is a method for extracting a candidate for a three-dimensional shape measurement target from a plurality of face shape candidates, the method including: calculating, for each of the plurality of face shape candidates, a facial texture evaluation value representing a degree of match between an input face image and a texture of the face shape candidate; calculating, for each of the plurality of face shape candidates, first likelihood between a reference face shape and the face shape candidate; calculating, for each of the plurality of face shape candidates, a first correlation evaluation value representing a degree of correlation between the facial texture evaluation value and the first likelihood; and extracting, from the plurality of face shape candidates, a face shape candidate having the first correlation evaluation value lower than a first threshold, as the measurement target.

A face shape estimating method according to this disclosure is a method including: measuring a three-dimensional shape of a face shape candidate extracted as the measurement target by the measurement target extracting method; calculating a first shape candidate evaluation value for each of the plurality of face shape candidates, based on the facial texture evaluation value and the first likelihood; calculating, for each of the plurality of extracted face shape candidates, a second shape candidate evaluation value, using the three-dimensional shape; and determining an estimated shape of the facial image from the plurality of face shape candidates based on the first shape candidate evaluation value and the second shape candidate evaluation value.

The disclosure of Japanese Patent Application No. 2011-272203, filed on Dec. 13, 2011, including the specification, drawings and abstract, is incorporated herein by reference in its entirety.

INDUSTRIAL APPLICABILITY

The present invention is useful in that the shape of a face having a change in expressions difficult to estimate using only a two-dimensional image can be estimated highly accurately with a low amount of calculation.

REFERENCE SIGNS LIST

100, 300, 500 Measurement target extracting apparatus
200, 400, 600 Face shape estimating apparatus
101 Input section
102, 102*a*, 102*b* Face shape candidate holding section
103, 301 Facial texture evaluation value calculating section
104, 302 Facial expression changing likelihood calculating section
105, 303 Correlation evaluation section
106, 304 Determining section
107, 305 Extracting section
201 Shape candidate evaluation section
202, 401 Three-dimensional measuring section
203, 402, 601 Re-evaluation section
204 Determining section
501 Mimic muscle likelihood calculating section

The invention claimed is:

1. A measurement target extracting apparatus that extracts a candidate for a three-dimensional shape measurement target among a plurality of face shape candidates, the apparatus comprising:
a microcomputer arranged to:
calculate, for each of the plurality of face shape candidates, a facial texture evaluation value representing a degree of match between a texture of an input face image and a texture of the face shape candidate;
calculate, for each of the plurality of face shape candidates, first likelihood between a reference face shape and the face shape candidate as a facial expression changing likelihood;
calculate, for each of the plurality of face shape candidates, a first correlation evaluation value representing a degree of correlation between the facial texture evaluation value and the first likelihood; and
extract, from the plurality of face shape candidates, a face shape candidate having the first correlation evaluation value lower than a first threshold, as the measurement target.

2. The measurement target extracting apparatus according to claim 1, wherein the microcomputer is further arranged to:
calculate the facial texture evaluation value, and calculates, for each of face parts of the face shape candidate, a face part texture evaluation value representing a degree of match between the facial image and the face part;
calculate the first likelihood, and calculate, for each of the face parts in the face shape candidate, second likelihood between the reference face shape and the face part;
calculate the first correlation evaluation value, and calculate, for each of the face parts in the face shape candidate, a second correlation evaluation value representing a degree of correlation between the face part texture evaluation value and the second likelihood; and
extract, from face parts in a face shape candidate having the first correlation evaluation value lower than the first threshold, a face part having a second correlation evaluation value lower than a second threshold, as a measurement target.

3. The measurement target extracting apparatus according to claim 2, wherein the microcomputer is further arranged to select, from face parts having the second correlation evaluation values lower than the second threshold, a number of face parts corresponding to a predetermined proportion of to a total number of the face parts in ascending order of the second correlation values, and extract the selected face parts as the measurement target.

4. The measurement target extracting apparatus according to claim 2, wherein the microcomputer is further arranged to calculate the first likelihood representing a degree of match between the position of the face part in the face shape candidate and a movable range of mimic muscles for moving the face part, by comparing the position of the face part in the face shape candidate and a position of the reference face shape.

5. The measurement target extracting apparatus according to claim 1, wherein the microcomputer is further arranged to calculate, for each of the plurality of face shape candidates, the first likelihood representing an amount of change between three-dimensional coordinates of a plurality of feature points representing the face shape candidate and three-dimensional coordinates at positions corresponding to the plurality of feature points in the reference face shape.

6. The measurement target extracting apparatus according to claim 1, wherein the reference face shape is an expressionless face shape.

7. The measurement target extracting apparatus according to claim 1, wherein the reference face shape is a face shape obtained a specific time ago.

8. A face shape estimating apparatus comprising:
the measurement target extracting apparatus according to claim 1; and
the microcomputer or another microcomputer being arranged to,
measure a three-dimensional shape of a face shape candidate extracted as the measurement target by the measurement target extracting apparatus;
calculate a first shape candidate evaluation value for each of the plurality of face shape candidates, based on the facial texture evaluation value and the first likelihood;
calculate, for each of the plurality of extracted face shape candidates, a second shape candidate evaluation value, using the three-dimensional shape; and
determine an estimated shape of the facial image from the plurality of face shape candidates based on the first shape candidate evaluation value and the second shape candidate evaluation value.

9. The face shape estimating apparatus according to claim 8, wherein:
in the measurement target extracting apparatus, the microcomputer is further arranged to:
calculate the face texture evaluation value, and calculate, for each of face parts in the face shape candidate, a face part texture evaluation value representing a degree of match between the facial image and the face part;
calculate the first likelihood, and calculate, for each of the face parts in the face shape candidate, second likelihood between the reference face shape and the face part;
calculate the first correlation evaluation value, and calculate, for each of the face parts in the face shape candidate, a second correlation evaluation value representing a degree of correlation between the face part texture evaluation value and the second likelihood; and extract, from face parts in a face shape candidate having the first correlation evaluation value lower than the first threshold, a face part having the second correlation value lower than a second threshold, as the measurement target, the microcomputer or the another microcomputer being further arranged to:

measure a three-dimensional shape of the face part that was extracted; and calculate the second shape candidate evaluation value, using the three-dimensional shape of the face part.

10. The face shape estimating apparatus according to claim 8, wherein the microcomputer or the another microcomputer is further arranged to calculate, for each of the extracted face shape candidates, the second shape candidate evaluation value based on the facial texture evaluation value and a result of comparison between the three-dimensional shape and three-dimensional coordinates of the face shape candidate.

11. The face shape estimating apparatus according to claim 8, wherein the microcomputer or the another microcomputer is further arranged to generate a new face shape candidate using the extracted face shape candidate and information regarding the three-dimensional shape, and calculate the second shape candidate evaluation value corresponding to each of the new face shape candidates, based on the facial texture evaluation value and the first likelihood that correspond to the new face shape candidate.

12. The face shape estimating apparatus according to claim 8, wherein the microcomputer or the another microcomputer is further arranged to determine, as the estimated shape, a face shape candidate corresponding to the largest value among the first shape candidate evaluation value and the second shape candidate evaluation value.

13. The face shape estimating apparatus according to claim 8, wherein the microcomputer or the another microcomputer is further arranged to determine the estimated shape by calculating a weighted average of the plurality of face shape candidates, based on a weight calculated using the first shape candidate evaluation value and the second shape candidate evaluation value.

14. A measurement target extracting method for extracting a candidate for a three-dimensional shape measurement target from a plurality of face shape candidates, the method comprising:

calculating, for each of the plurality of face shape candidates, a facial texture evaluation value representing a degree of match between a texture of an input face image and a texture of the face shape candidate;

calculating, for each of the plurality of face shape candidates, first likelihood between a reference face shape and the face shape candidate;

calculating, for each of the plurality of face shape candidates, a first correlation evaluation value representing a degree of correlation between the facial texture evaluation value and the first likelihood; and extracting, from the plurality of face shape candidates, a face shape candidate having the first correlation evaluation value lower than a first threshold, as the measurement target.

15. A face shape estimating method comprising:

measuring a three-dimensional shape of a face shape candidate extracted as the measurement target by the measurement target extracting method according to claim 14;

calculating a first shape candidate evaluation value for each of the plurality of face shape candidates, based on the facial texture evaluation value and the first likelihood;

calculating, for each of the plurality of extracted face shape candidates, a second shape candidate evaluation value, using the three-dimensional shape; and determining an estimated shape of the facial image from the plurality of face shape candidates based on the first shape candidate evaluation value and the second shape candidate evaluation value.

* * * * *